US011780531B2

(12) United States Patent
Larson et al.

(10) Patent No.: US 11,780,531 B2
(45) Date of Patent: Oct. 10, 2023

(54) METHODS AND APPARATUS FOR RECONFIGURABLE AUTONOMOUS VEHICLE

(71) Applicant: Massachusetts Institute of Technology, Cambridge, MA (US)

(72) Inventors: Kent Larson, Cambridge, MA (US); Naroa Coretti Sanchez, Cambridge, MA (US); Michael Lin, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 413 days.

(21) Appl. No.: 17/078,807

(22) Filed: Oct. 23, 2020

(65) Prior Publication Data

US 2021/0122442 A1 Apr. 29, 2021

Related U.S. Application Data

(60) Provisional application No. 62/926,470, filed on Oct. 26, 2019.

(51) Int. Cl.
*B62M 6/45* (2010.01)
*B62K 13/04* (2006.01)
*G05D 1/00* (2006.01)
(Continued)

(52) U.S. Cl.
CPC ............... *B62M 6/45* (2013.01); *B62J 1/08* (2013.01); *B62J 45/40* (2020.02); *B62K 13/04* (2013.01);
(Continued)

(58) Field of Classification Search
CPC ... B62M 6/45; B62M 9/00; B62M 6/40; B62J 1/08; B62J 45/40; B62J 45/20;
(Continued)

(56) References Cited

U.S. PATENT DOCUMENTS 5,530,040 A * 6/1996 Ross .................. C08L 93/04
9,321,499 B2   4/2016 Kim
(Continued)

FOREIGN PATENT DOCUMENTS

EM       094660       2/2017
GB     2466825 A      7/2010

OTHER PUBLICATIONS

Yao, J., IDK: An Interaction Development Kit to design interactions for lightweight autonomous vehicles; Master's Thesis, Massachusetts Institute of Technology, Aug. 9, 2019.
Metz, C., And Now, A Bicycle Built for None; published in The New York Times, Jul. 31, 2019.

*Primary Examiner* — Russell Frejd
*Assistant Examiner* — Ellis B. Ramirez
(74) *Attorney, Agent, or Firm* — DALY, CROWLEY, MOFFORD & DURKEE, LLP

(57) ABSTRACT

A vehicle may have a seat and front wheel similar to those of a bicycle. However, the vehicle may have two rear wheels. The position of the two rear wheels may be adjustable. When the two rear wheels touch each other, the vehicle may function as a bicycle. When they are moved apart, the vehicle may function as a tricycle. In tricycle mode, the vehicle may travel autonomously without a human rider. In bicycle mode, a human may ride the vehicle like a bicycle. To transition between bicycle and tricycle modes, each rear wheel may rotate about a horizontal axis that is parallel to a longitudinal axis of the vehicle. In some cases, a bike chain is connected to only one of the rear wheels. In bicycle mode, motion imparted by the chain to one rear wheel may be transferred to the other by friction.

18 Claims, 11 Drawing Sheets

(51) Int. Cl.
*G01C 21/34* (2006.01)
*B62M 9/00* (2006.01)
*B62J 45/40* (2020.01)
*B62J 1/08* (2006.01)

(52) U.S. Cl.
CPC ........... *B62M 9/00* (2013.01); *G01C 21/3453* (2013.01); *G05D 1/0088* (2013.01)

(58) Field of Classification Search
CPC .......... B62K 13/04; B62K 3/04; B62K 5/027; B62K 5/06; B62K 13/08; B62K 21/00; G01C 21/3453; G05D 1/0088; B62D 9/02
USPC ................. 701/25, 22, 41, 42; 180/89.4
See application file for complete search history.

(56) References Cited

U.S. PATENT DOCUMENTS

| | | | |
|---|---|---|---|
| 2007/0007745 A1* | 1/2007 | Shim | B62K 25/32 |
| 2007/0205576 A1* | 9/2007 | Lynch | B62K 5/02 |
| 2008/0001374 A1* | 1/2008 | Liao | B62K 9/02 |
| 2016/0014252 A1* | 1/2016 | Biderman | A61G 5/04 |
| | | | 701/29.2 |
| 2017/0291629 A1* | 10/2017 | O Connell | B62K 15/006 |
| 2019/0047554 A1 | 2/2019 | Vaughn | |
| 2019/0250619 A1* | 8/2019 | Gillett | B62K 23/02 |
| 2020/0102043 A1* | 4/2020 | Zhang | B62J 45/415 |
| 2020/0409381 A1* | 12/2020 | Corbett | B62K 21/00 |

* cited by examiner

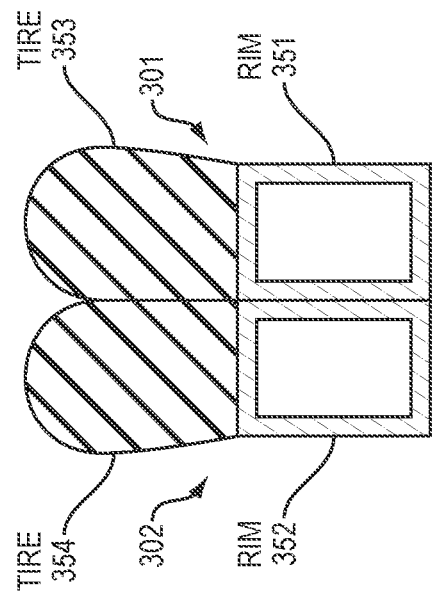
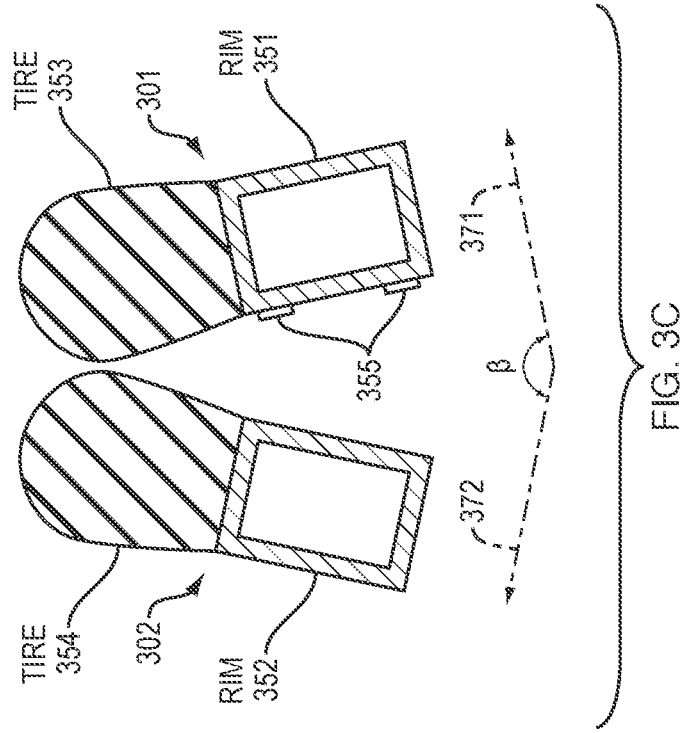

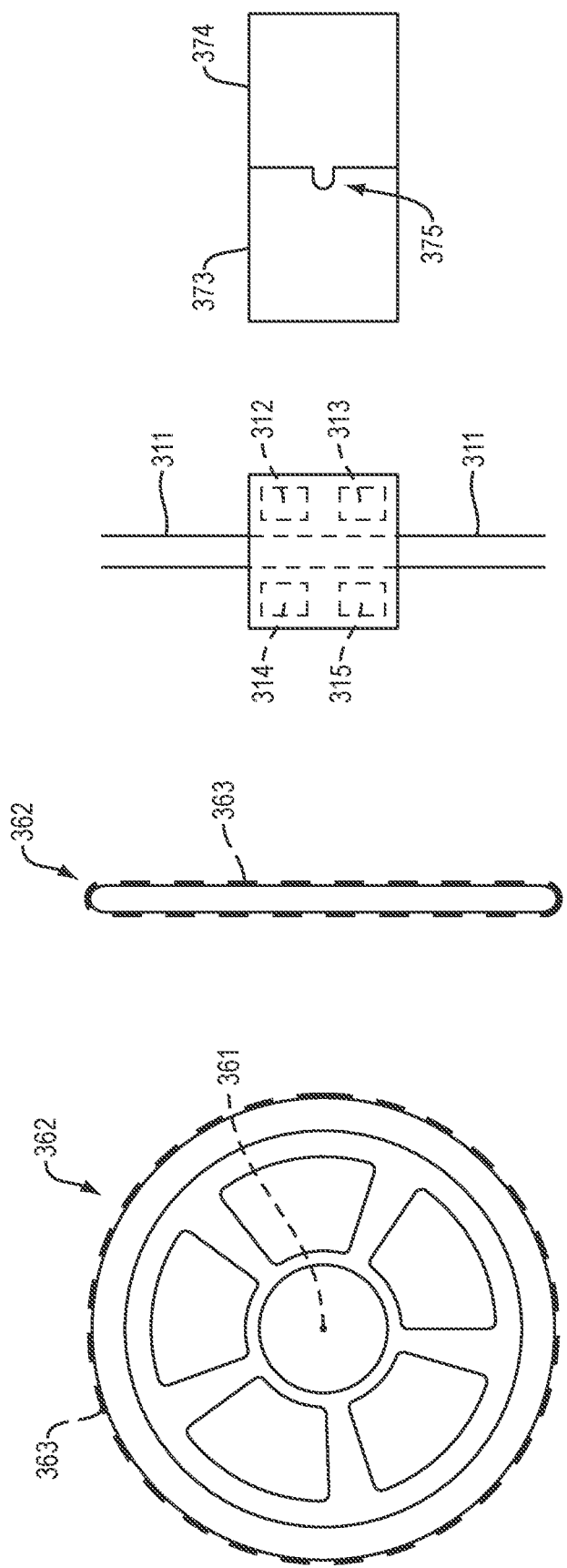

METHODS AND APPARATUS FOR RECONFIGURABLE AUTONOMOUS VEHICLE

RELATED APPLICATIONS

This application claims the benefit of U.S. Provisional Application No. 62/926,470 filed Oct. 26, 2019 (the "Provisional").

FIELD OF TECHNOLOGY

The present invention relates generally to autonomous bicycles and autonomous tricycles.

COMPUTER PROGRAM LISTING

The following six computer program files are incorporated by reference herein: (1) devices.txt with a size of about 1 KB; (2) joy.txt with a size of about 1 KB; (3) joysticick-test.txt with a size of about 1 KB; (4) joysticktest.txt with a size of about 1 KB; (5) setRule.txt with a size of about 1 KB; and (6) vesc.txt with a size of about 1 KB. Each of these six files were created as an ASCII .txt file on Sep. 26, 2020.

SUMMARY

In illustrative implementations of this invention, a three-wheeled vehicle has one front wheel and two rear wheels. The vehicle may operate in either tricycle mode or bicycle mode. In tricycle mode, the two rear wheels may be spread apart at a substantial distance from each other, to increase the lateral stability of the vehicle. In bicycle mode, the two rear wheels may touch each other or may be very close to each other.

In bicycle mode, the two rear wheels may function as a single wheel and the vehicle may function like a bicycle. The user experience, in bicycle mode, may be similar to riding a conventional bicycle.

In tricycle mode, the vehicle may propel and steer itself in a manner that is at least locally autonomous.

We sometimes call the three-wheeled vehicle (which can transition between bicycle mode and tricycle mode) an "Autonomous Bicycle/Tricycle" or an "ABT".

In some cases, in order to transition between bicycle mode and tricycle mode, each rear wheel rotates about a substantially horizontal axis. This horizontal axis of rotation may be a longitudinal axis of the ABT. Alternatively, this horizontal axis of rotation may be parallel or substantially parallel to a longitudinal axis of the ABT. For instance, in some cases, a longitudinal axis of an upright ABT is a horizontal line that lies only in a vertical plane which intersects both a seat tube and head tube of the ABT. To transition the ABT from bicycle mode to tricycle mode (or vice versa), the right rear wheel and left rear wheel may rotate about a first axis and a second axis, respectively, where the first and second axes are substantially parallel to the longitudinal axis.

In some cases, each rear wheel has an axle that is attached to, or part of, what we sometimes call a "rear frame". The ABT may have two rear frames, one for each rear wheel. The rear frame for a given rear wheel may connect: (a) the axle of that rear wheel; and (b) the central frame or a part attached to the central frame of the ABT. For instance, the rear frame may connect and attach to (a) the axle of a rear wheel and (b) a joint adjacent to a seat tube of the ABT. In some cases, a rear frame comprises a roughly triangular structure. The rear frame for a rear wheel may transfer a portion of the load between the main body of the ABT and that rear wheel.

In some cases, in order to transition between bicycle mode and tricycle mode: (a) the right rear wheel and a first rear frame attached to it rotate about a first horizontal axis; (b) the left rear wheel and a second rear frame attached to it rotate about a second horizontal axis; and (c) the first and second horizontal axes are each parallel, or substantially parallel, to a longitudinal axis of the ABT.

In some cases, the ABT includes a pedal mechanism that a human rider may pedal in order to propel (or at least help propel) the ABT's motion during bicycle mode. The pedal mechanism may output a torque that is transmitted to a rear wheel via a bike chain (or any other mechanism to transmit torque such as a Cardan joint).

In some cases: (a) the bike chain (or other transmission mechanism) is attached to one but not both of the rear wheels; and (b) the pedal mechanism is attached to the rear frame for one rear wheel but not to the rear frame for the other rear wheel.

Thus, in some cases, torque from the bike chain is transmitted directly to only one, but not both, of the two rear wheels. This could, if corrective measures where not taken, cause the two rear wheels to slip relative to each other (e.g., to rotate about their respective axles at different angular speeds). For instance, if a rider were to tilt the ABT to the left in such a way that the weight of the ABT was borne partially by the left rear wheel but not the right rear wheel, and if the rider were to simultaneously begin pedaling a pedal mechanism that transmits torque via a chain to only the right rear wheel, then—unless corrective measures were taken—the right rear wheel might slip relative to the left rear wheel. The slipping between the two rear wheels may comprise (a) a difference in angular speed or (b) movement of an axis of rotation of one rear wheel relative to the axis of rotation of the other rear wheel (e.g., if the axle of one rear wheel moves vertically relative to the axle of the other rear wheel).

To solve this problem, the ABT may be configured in such a way that, when the ABT is in bicycle mode, the two rear wheels rotate or tend to rotate (about their respective axes) as a single unit, due to friction or other coupling between the two rear wheels. Thus, when the ABT is in bicycle mode, friction or other coupling between the two rear wheels: (a) may help cause the two rear wheels to rotate about their respective axes at the same angular speed; and (b) may help cause the axis of rotation of the right rear wheel to remain in a constant position (and constant orientation) relative to the axis of rotation of the left rear wheel.

When the ABT is in bicycle mode, friction between the two rear wheels may be created in one or more ways. For instance, the tires of the two rear wheels may press against each other, creating friction. Also, the rims of the two rear wheels may have flat inner surfaces, such that the when the ABT is in bicycle mode, a flat inner surface of the rim of the left rear wheel touches a flat inner surface of the rim of the right rear wheel, creating friction. In some cases, the inter-wheel friction is increased by thin layers that are attached to inner surface(s) of rear wheel(s) and that have a high coefficient of friction. For instance, thin layers of a sticky polymer may be sandwiched between the rims of the two rear wheels in bicycle mode and may thus increase friction between the two rear wheels in bicycle mode. In some cases, these thin layers of sticky polymer are attached to only one of the wheels. Alternatively, some of these thin layers may be attached to one rear wheel and some to the other rear wheel.

In some cases, when the ABT is in bicycle mode, the two rear wheels mechanically couple. Any type of coupling mechanism (e.g., bush pin type coupling, gears, Oldham coupling or jaw coupling) may employed to create this coupling of the two rear wheels when the ABT is in bicycle mode. For instance, when the ABT is in bicycle mode, a rigid or semi-rigid protruding region on a side of one rear wheel may fit into a hole in a side of the other rear wheel. This in turn may cause (or help to cause) the two rear wheels to rotate (about their respective axles) as a single, integral unit without slipping relative to each other.

In some implementations, at least three electric motors are onboard the ABT: A first electric motor may propel the ABT, a second electric motor may steer the ABT, and a third electric motor may pull or push on a brake cable to brake the ABT.

In some cases, the drive motor (which propels forward motion of the ABT) is a hub motor in the front wheel of the ABT. Alternatively, the drive motor may be a mid-motor or a rear hub motor.

In some cases, the drive motor propels motion of the ABT when the ABT is in tricycle mode and is operating autonomously. In some cases, the drive motor also propels (or at least helps to propel) the ABT when the ABT is not operating autonomously. For instance, in some cases, the drive motor may propel—or at least help to propel—the ABT while the ABT is in bicycle mode.

When the ABT is in tricycle mode, the ABT may operate in a manner that is fully autonomous, or that is at least partially or locally autonomous. For instance, an ABT may receive, from a remote central server, data that specifies a route and information about conditions along the route. Then one or more computers onboard the ABT may, among other things: (a) convert the route into instructions for a drive motor and steering motor to propel and steer the ABT in such a way as to follow the route; (b) detect conditions in the ABT's surroundings, by analyzing measurements taken by sensors onboard the ABT; (c) calculate an appropriate response to the detected conditions; and (d) output control signals that cause the ABT to respond appropriately to the detected conditions.

In some cases, a fleet of ABTs provides transportation services for persons in a city. For instance, a human user in the city may, via an app, send a wireless signal that asks to use an ABT for a ride. A central server may receive this wireless signal. The server may then choose, based on localization, a set of candidate ABTs for the ride. The server may then select, from the set of candidate ABTs, a candidate ABT that would have the shortest (or otherwise most cost-effective) route to the user. The server may then send a wireless signal to the selected ABT, which signal encodes instructions and data regarding a route to take and regarding conditions along the route. Or, in some cases: (a) the signal may encode the location to which the selected ABT should go to pick up the user (but may omit the route that the selected ABT would travel to that location); and (b) the selected ABT may calculate the route using a digital map that is stored onboard the ABT. In some cases, the selected ABT receives information about the route and conditions along the route from the same server (i.e., the server that instructs the ABT to go to a given location) or from a different server. The selected ABT may then travel to the user while in tricycle mode (with rear wheels spread apart from each other), propelling and steering itself. Once the ABT reaches the human user, the ABT may change to bicycle mode (with rear wheels closed together) and the user may ride the ABT, in a manner similar to a conventional bicycle, to the user's destination. Once the ABT reaches the destination, the rider may get off the ABT, and the ABT may convert to tricycle mode. When the ABT is in tricycle mode and is operating autonomously, a central server may instruct the ABT: (a) to park and wait for instructions for the next ride; (b) to travel to a charging station to recharge the ABT's battery; (c) to travel to pick up a human rider for the next ride, and/or (d) to travel towards where demand from users is occurring or is predicted to occur.

The Summary and Abstract sections and the title of this document: (a) do not limit this invention; (b) are intended only to give a general introduction to some illustrative implementations of this invention; (c) do not describe all of the details of this invention; and (d) merely describe non-limiting examples of this invention. This invention may be implemented in many other ways. Likewise, the Field of Technology section is not limiting; instead it identifies, in a general, non-exclusive manner, a field of technology to which some implementations of this invention generally relate.

BRIEF DESCRIPTION OF THE DRAWINGS

FIGS. 3C and 3D are cross-sectional views of portions of two rear wheels of an ABT.

In FIGS. 1A, 2A, 3A and 3D, the two rear wheels of the ABT are together in bicycle mode. In FIGS. 1B, 2B, 3B and 3C, the two rear wheels of the ABT are spread apart from each other in tricycle mode.

FIG. 3E is a side view of a rear wheel.

FIG. 3F is a top view of a rear wheel.

FIG. 3G shows sensors mounted on an ABT.

FIG. 3H shows a prong and corresponding hole in the center of the two rear wheels.

The above Figures are not necessarily drawn to scale. The above Figures show illustrative implementations of this invention, or provide information that relates to those implementations. The examples shown in the above Figures do not limit this invention. This invention may be implemented in many other ways.

DETAILED DESCRIPTION

General

Figure 1A:
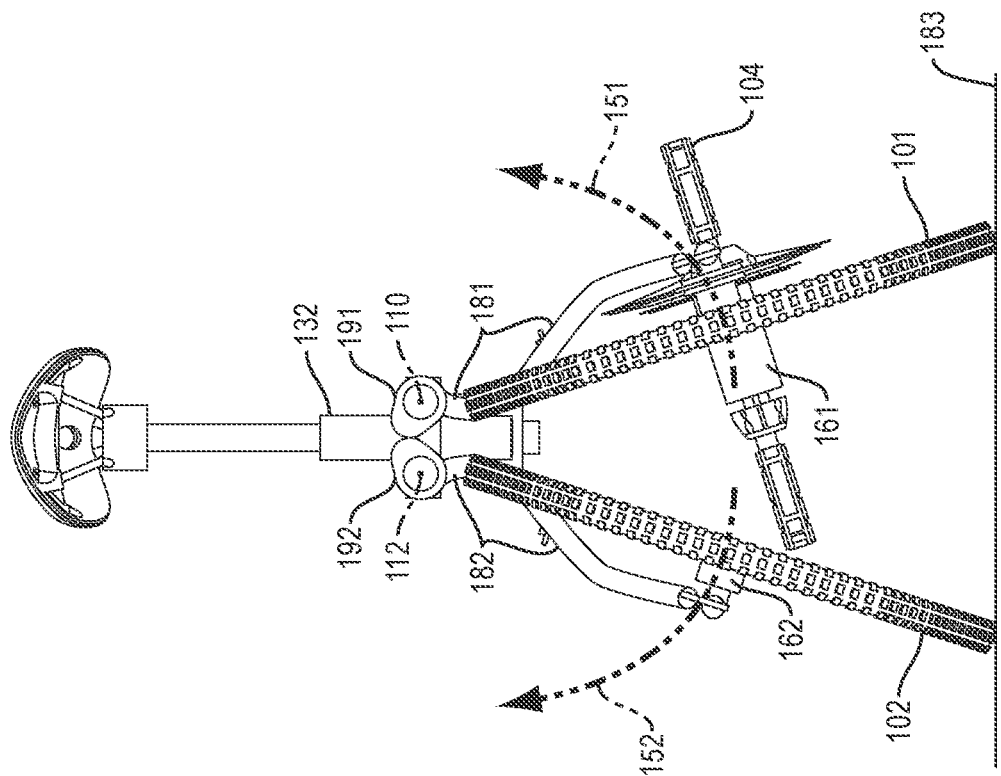
FIGS. 1A and 1B are each a rear view of an autonomous bicycle/tricycle (ABT).
Figure 1B:
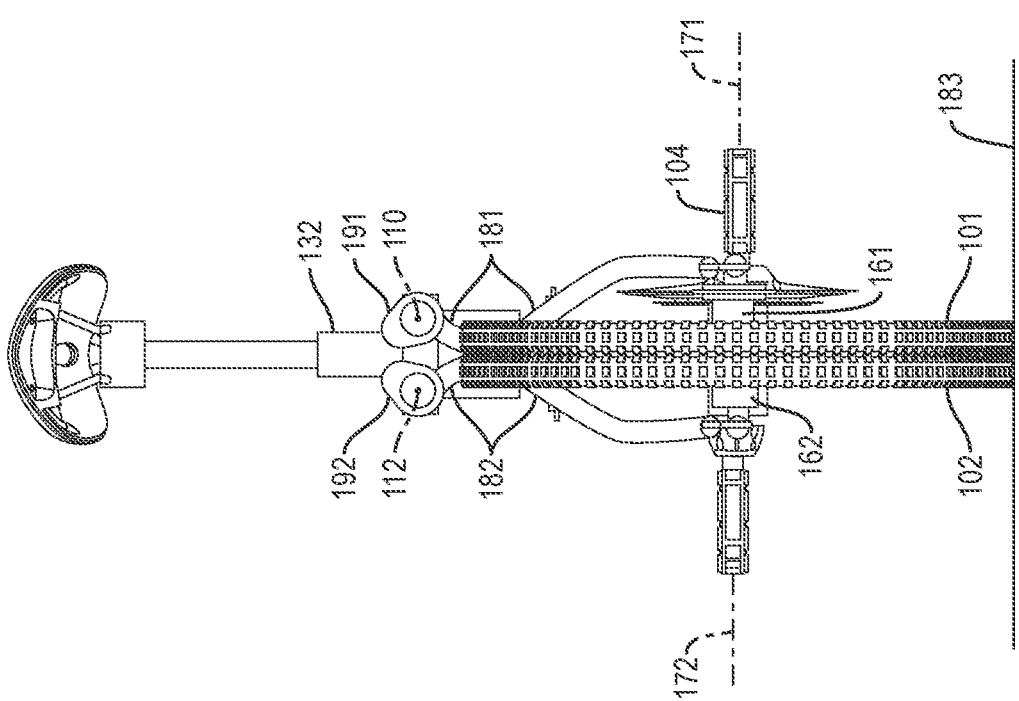
Figure 2B:
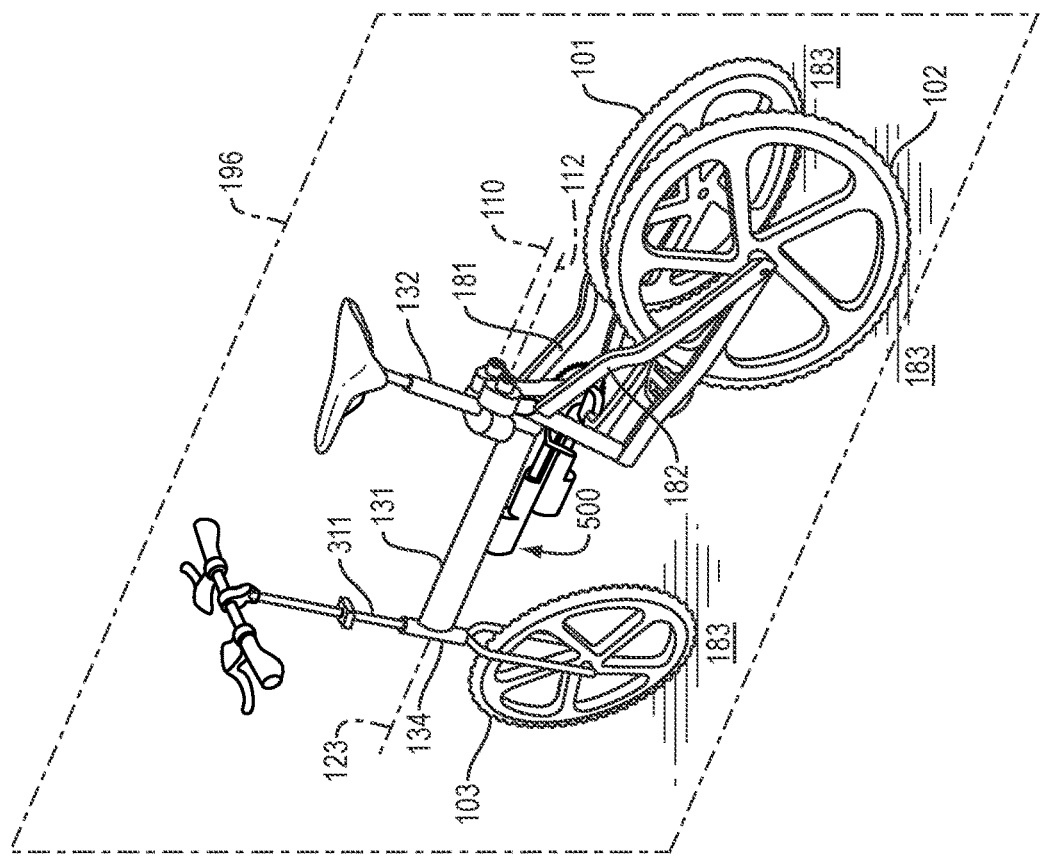
FIGS. 2A and 2B are each a perspective view of an ABT.
Figure 2A:
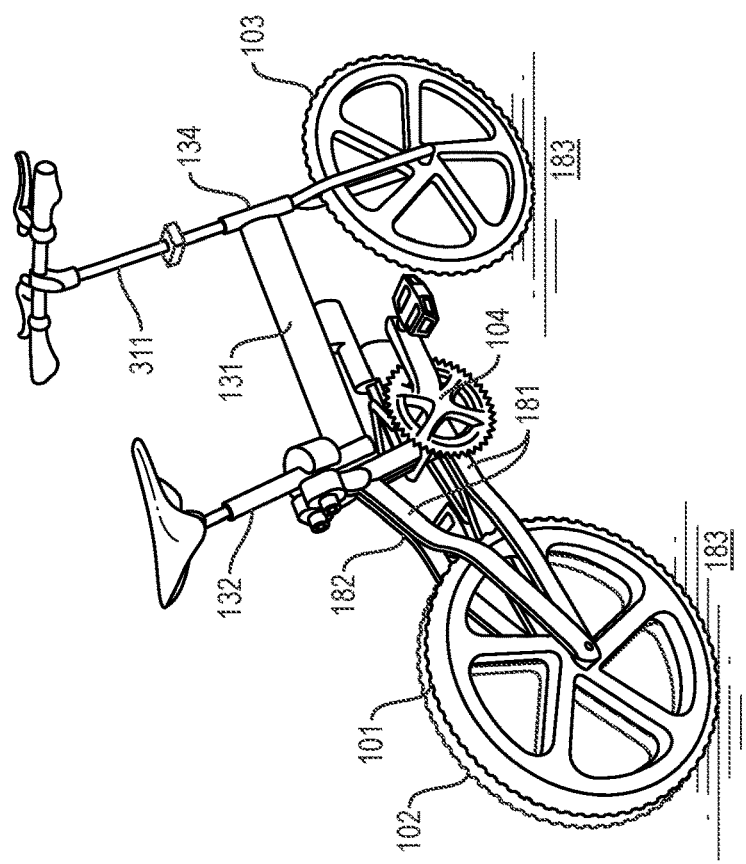
Figure 3B:
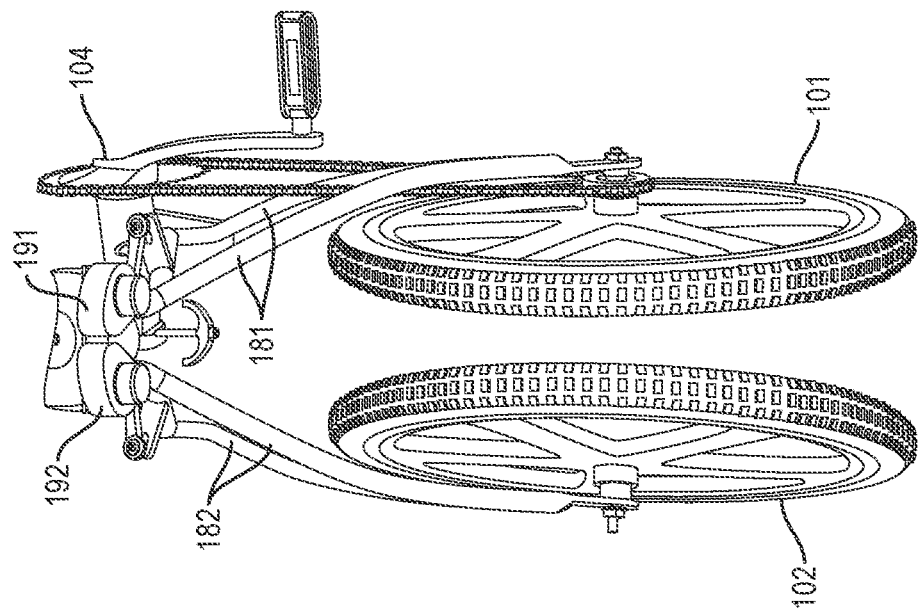
FIGS. 3A and 3B are each a partial top view of an ABT.
Figure 3A:
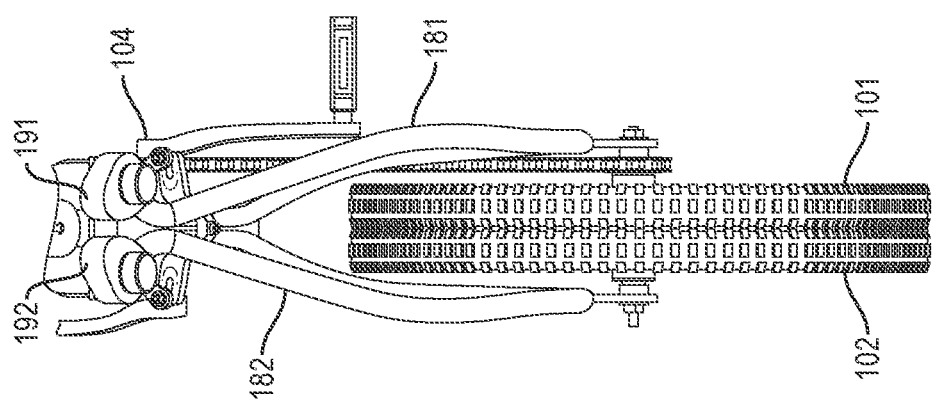

FIGS. 1A and 1B are each a rear view of an autonomous bicycle/tricycle (ABT). FIGS. 2A and 2B are each a perspective view of an ABT. FIGS. 3A and 3B are each a top view of an ABT.

In FIGS. 1A-3B, the autonomous bicycle/tricycle (ABT) includes two rear wheels 101, 102 and one front wheel 103.

When the ABT is operating in bicycle mode, the two rear wheels 101, 102 may be close together and may function as a single wheel. When the ABT is in bicycle mode, a human rider may ride, pedal and steer it like a conventional bicycle. FIGS. 1A, 2A, and 3A show the ABT in bicycle mode, with the two rear wheels 101, 102 close together.

When the ABT is operating in tricycle mode, the two rear wheels 101, 102 may be separated from each by a substantial physical distance and may function as two separate rear wheels of a tricycle. When the ABT is in tricycle mode, the ABT may autonomously locomote and steer itself. The tricycle configuration—with two rear wheels that are apart from each other—may increase the lateral stability of the ABT, enabling it to autonomously maneuver without tipping over to the right or to the left. FIGS. 1B, 2B, and 3B show the ABT in tricycle mode, with the two rear wheels 101, 102 apart from each other.

When the ABT is operating in bicycle mode, the two rear wheels 101, 102 may emulate a single rear wheel of a conventional bicycle. This is because, in bicycle mode, the two rear wheels 101, 102: (a) may touch each other; (b) may rotate at substantially equal angular speeds (e.g., due to friction or other coupling between the two wheels); and (c) may rotate about substantially parallel axes of rotation. For instance, in bicycle mode, a surface of a rim of right rear wheel 101 may touch and conform to a surface of a rim of left rear wheel 102. In some cases: (a) the rim of each rear wheel has a flat (planar) surface; and (b) these two flat surfaces touch and lie flat against each other when the ABT is in bicycle mode. In bicycle mode, a rider may pedal using pedal mechanism 104, causing right rear wheel 101 to rotate. This rotation of wheel 101 may in turn cause left rear wheel 102 to also rotate at a substantially equal angular speed, due to friction between the two rear wheels (or due to coupling of the two rear wheels). In some cases, patches of material with a high coefficient of friction (e.g., a sticky polymer pad) are attached to a rim of one of the rear wheels or to rims of the two rear wheels, respectively. When the ABT is in bicycle mode, each such patch may be sandwiched between and touch the rims of both rear wheels (or may touch a patch attached the other rear wheel), thereby creating friction that is sufficient to cause the two rear wheels to rotate at substantially equal angular speeds. When the ABT is in bicycle mode and the wheels of the ABT are rolling along the ground: (a) right rear wheel 101 may rotate about an axis of rotation 171; (a) left rear wheel 102 may rotate about an axis of rotation 172; and (c) axes 171 and 172 may be parallel (or substantially parallel) to each other or may be co-located.

When the ABT is operating in tricycle mode, the two rear wheels 101, 102 may function in a manner that is similar—in some respects—to two rear wheels of a conventional tricycle. This is because, in some cases, when the ABT is in tricycle mode, the two rear wheels 101, 102 are not touching each other and their respective hubs are separated from each other by a substantial distance. For instance: (a) the two rear wheels 101, 102 may each have the same diameter d; and (b) in tricycle mode, the hubs of the two rear wheels 101, 102 may be separated from each other by a distance that: (a) is greater than or equal to 5% of diameter d and less than 10% of diameter d; (b) is greater than or equal to 10% of diameter d and less than 15% of diameter d; (c) is greater than or equal to 15% of diameter d and less than 20% of diameter d; (d) is greater than or equal to 20% of diameter d and less than 30% of diameter d; (e) is greater than or equal to 30% of diameter d and less than 40% of diameter d; (f) is greater than or equal to 40% of diameter d and less than 50% of diameter d; or (g) is greater than or equal to 50% of diameter d and less than 100% of diameter d. In tricycle mode, the substantial distance between the two rear wheels 101, 102 may impart lateral stability, preventing the ABT from tipping over to its right or left side.

When the ABT is operating in tricycle mode, the two rear wheels 101, 102 may be tilted relative to each other. In tricycle mode, the two rear wheels 101, 102 may rotate about axes of rotation that are not substantially parallel to each other.

In some implementations, to change the ABT from bicycle mode to tricycle mode: (a) the right rear wheel rotates in a first angular direction about a first axis that is parallel or substantially parallel to a longitudinal axis of the ABT; and (b) the left rear wheel rotates in second angular direction about a second axis that is parallel or substantially parallel to the longitudinal axis. The first and second angular directions may be opposite to each other. A non-limiting example of a longitudinal axis of an ABT is a horizontal straight line that is located, when the ABT is upright, only in a vertical plane which intersects both (a) the head tube of the ABT and (b) the seat tube of the ABT. Note that the rotations described above in this paragraph are not rotation of a wheel rim about an axle in the center of the wheel.

In some implementations, to change the ABT from bicycle mode to tricycle mode: (a) a first unit—which comprises the right rear wheel and a first frame attached to the right rear wheel—rotates in a first angular direction about a first axis that is horizontal or substantially horizontal; (b) a second unit—which comprises the left rear wheel and a second frame attached to the left rear wheel—rotates in a second angular direction about a second axis that is horizontal or substantially horizontal; (c) these rotations tend to increase the distance between the two rear wheels; and (d) the first and second angular directions are opposite to each other. Note that the rotations described above in this paragraph are not rotation of a wheel rim about an axle in the center of the wheel.

For instance, in FIGS. 1B and 2B, to change from bicycle mode to tricycle mode: (a) a first unit comprising right rear wheel 101 and rear frame 181 rotates counterclockwise about a horizontal (or substantially horizontal) axis 110; (b) a second unit comprising left rear wheel 102 and rear frame 182 rotates clockwise about horizontal axis 112; and (c) these rotations tend to increase the distance between the two rear wheels. Note, again, that the rotations described in the preceding sentence are not rotation of a wheel rim about an axle in the center of the wheel.

Rear frames 181, 182 may each comprise a frame or a set of tubes (e.g., a metal frame or a set of metal tubes). In some cases: (a) rear frame 181 includes two parts that are sometimes called a seat stay and a chain stay; and (b) rear frame 182 includes two parts that are sometimes called a seat stay and a chain stay. Rear frame 181 may attach, via a first pivot joint, to a hub that is welded to seat tube 132 of the ABT. (In FIGS. 2A and 2B, the hub, seat tube 132, top tube 131, and head tube 134 are welded together to form a single integral structure, which is an example of what we sometimes call a "main frame" of the ABT). Likewise, rear frame 182 may attach, via a second pivot joint, to the hub that is welded to seat tube 132. The first and second pivot joints may rotate about axes 110 and 112, respectively.

As noted above, the right and left rear wheels may rotate about axes 110, 112 when the ABT is transitioning from bicycle mode to tricycle mode. In the example shown in FIG. 1B, axes 110, 112: (a) are horizontal or substantially horizontal; and (b) are parallel or substantially parallel to longitudinal axis 123 of the ABT. In FIG. 1B, longitudinal axis 123 of the ABT is a horizontal line that lies entirely in vertical plane 196. In the example shown in FIG. 1B, vertical plane 196 intersects the centerlines of seat tube 132, top tube 131, and head tube 134, respectively. Axes 110, 112 are shown as dots in FIG. 1B because they are perpendicular to the plane on which FIG. 1B is drawn (loosely speaking, axes 110, 112 come straight out of the page in FIG. 1B). In FIGS. 1A-2B, the ABT is upright.

In FIGS. 1A-2B, wheels 101, 102, 103 of the ABT are resting on a flat, horizontal, physical surface 183 (such as pavement or the ground) that is underneath the ABT. In FIGS. 1A-2B, at least part of the weight of each of these three wheels is resting on surface 183. When the ABT is traveling forward along a trajectory, front wheel 103 may reach a given point on the trajectory before rear wheels 101, 102 reach the given point. In FIGS. 1A-2B: (a) horizontal surface 183 is perpendicular to the local direction of gravitational force; and (b) vertical is parallel to the local direction of gravitational force.

Each rear frame (e.g., 181 or 182) may be configured to support at least a portion of the weight of the ABT (e.g., including a portion of the weight of the seat tube of the ABT) and to transmit, to the wheel to which it is attached, a corresponding load.

In some implementations, in order to transition the ABT from bicycle mode to tricycle mode, a centroid of the right rear wheel rotates in a first angular direction about a first axis and a centroid of the left rear wheel rotates in an opposite angular direction about a second axis, while: (a) the first and second axes are each horizontal or substantially horizontal; and (b) the first and second axes are each in a fixed position relative to the seat tube of the ABT. Note, again, that the rotations described above in this paragraph are not rotation of a wheel rim about an axle in the center of the wheel.

In some implementations, in order to transition the ABT from bicycle mode to tricycle mode, the right rear wheel rotates in a first angular direction about a first axis and the left rear wheel rotates in an opposite angular direction about a second axis. These rotations may cause the right and left rear wheels to move farther apart physically, thereby increasing distance between those two wheels. In some implementations, while these rotations occur: (a) the first and second axes are horizontal or substantially horizontal; (b) the first and second axes are each in a fixed position relative to the seat hub of the ABT, (c) the first axis (about which the right rear wheel rotates during the transition) does not intersect a convex hull of the right rear wheel; and (d) the second axis (about which the left rear wheel rotates during the transition) does not intersect a convex hull of the left rear wheel. Note, again, that the rotations described in this paragraph are not rotation of a wheel rim about an axle in the center of the wheel.

FIGS. 3E and 3F are a side view and top view, respectively, of a rear wheel. FIG. 3E shows a centroid 361 of a rear wheel 362. In FIGS. 3E and 3F, a dark dashed line 363 is an outline of the convex hull of the rear wheel 362. The term "convex hull" is used herein in its geometric sense. For instance, the "convex hull" of a 3D object (such as a bicycle wheel) is the smallest convex bounding volume for the 3D object.

Alternatively, in some cases, in order to transition the ABT from bicycle mode to tricycle mode (or vice versa), only one—but not both—of the rear wheels undergoes a rotation described in the preceding seven paragraphs.

In order to transition the ABT from bicycle mode to tricycle mode (or vice versa), the hubs of the rear wheels may move in curved trajectories. For instance, in FIG. 1B: (a) hub 161 of rear wheel 101 may move in a trajectory along curved line 151; and (b) hub 162 of rear wheel 102 may move in a trajectory along curved line 152. The movements of the hubs described in the preceding sentence may be relative to the seat tube of the ABT and may be due to rotation of the rear wheels about substantially horizontal axes (e.g., 110 and 112) as described above.

In illustrative implementations, a transition from bicycle mode to tricycle mode is reversible. In order to transition from tricycle mode to bicycle mode, each rear wheel may retrace the path it took—i.e., may move in the same path but in in an angular direction opposite to that in which it moved while the ABT transitioned from bicycle mode to tricycle mode.

FIGS. 3C and 3D are cross-sectional views of portions of two rear wheels of an ABT. In FIGS. 3C and 3D: (a) a right rear wheel 301 includes a rim 351 and a tire 353; and (b) a left rear wheel 302 includes a rim 352 and a tire 354. For instance, the rims 351, 352 may be metallic. The tires 353, 354 may comprise a polymer such as rubber, and may be inflatable. Patches 355 of a material that has a high coefficient of friction are attached to a surface of rim 351.

In FIG. 3D: (a) the ABT is in bicycle mode; (b) a flat surface of rim 351 of right wheel 301 is parallel to a flat surface of rim 352 of left wheel 302; (c) these two flat surfaces are touching each other and/or are touching patches 355 which are sandwiched between these two flat surfaces. In FIGS. 3C and 3D, tires 353 and 354 are wider than rims 351, 352. In FIG. 3D, when the ABT is in bicycle mode: (a) the tires of the two rear wheels touch and press against each other, creating friction which causes torque to be transmitted from one rear wheel to another; (b) the tires of the rear wheels are elastic and flatten against each other; and (c) patches 355 on rim 351 make contact with the rim 352 enhancing the transmission of torque.

In FIG. 3C, the ABT is in tricycle mode and the two rear wheels 351, 352: (a) are not touching each other; (b) are separated from each other by a substantial distance; and (c) are tilted relative to each other. FIG. 3C illustrates rear wheel alignment in tricycle mode. In FIG. 3C, when the ABT is in tricycle mode and is rolling along the ground: (a) right wheel 301 rotates about axis 371; (b) left wheel 302 rotates about axis 372; and (c) axis 371 is tilted relative to axis 372. For instance, in tricycle mode, axis 371 and axis 372 may form an obtuse angle that: (a) is less than or equal to 175 degrees and greater than 170 degrees; (b) is less than or equal to 170 degrees and greater than 160 degrees; (c) is less than or equal to 160 degrees and greater than 150 degrees; (d) is less than or equal to 150 degrees and greater than 140 degrees; or (e) is less than or equal to 140 degrees and greater than 130 degrees.

In some cases, a part in the radial center of one of the rear wheels may be inserted into the radial center of the other rear wheel when the ABT is in bicycle mode, in order to help prevent shearing of one rear wheel relative to the other rear wheel. For instance, in FIG. 3H, prong 375 of the right rear wheel fits into a corresponding hole in the left rear wheel when the ABT is in bicycle mode, to help prevent the two rear wheels from slipping relative to each other. For instance: (a) prong 375 may be a part of a hub (or axle) 374 of the right rear wheel; and (b) the corresponding hole may be in a hub (or axle) 373 of the right rear wheel. Prong 375 has a rounded end. This enables prong 375 of the right rear wheel to be easily inserted into a corresponding hole in the left rear wheel, even when the two rear wheels are not perfectly aligned with each other.

In FIGS. 1A-3B, pedal mechanism 104 is connected by a chain to right rear wheel 101 and, via that chain, transmits power that drives rotation of wheel 101. The pedal mechanism 104 is not connected by a chain to left rear wheel 102 and thus does not directly drive wheel 102. However, in bicycle mode, rotational force which is transmitted from to the pedal mechanism 104 to wheel 101 may in turn be transmitted from wheel 101 to wheel 102 due to friction or other mechanical coupling between the two wheels, thereby causing the two wheels to move together.

In illustrative implementations, the axle for each rear wheel is attached to, or is part of, a structure that connects that axle to the central frame of the ABT. We sometimes call this structure, which connects the axle of a rear wheel to the main frame of the ABT, a "rear frame". For instance, a rear frame may connect a seat tube and an axle of a rear wheel. A rear frame may be triangular, and may include what is sometimes called a seat stay and a chain stay. The rear frames for the two rear wheels, respectively, may be separate structures that do not touch each other. In some cases, the pedal assembly is attached to only one of the rear frames. For instance, in FIG. 1B, pedal assembly 104 is attached to rear frame 181 for right rear wheel 101 and is not attached to the rear frame 182 for left rear wheel 102.

In some cases: (a) a sensor detects if the pedals are in a position in which they would collide with another part (e.g., a rear frame) of the ABT; (b) a transducer (e.g., a loudspeaker or an LED light) outputs stimuli that is perceptible to a human user; and (c) this stimuli indicates that the ABT should move or be moved slightly backward until the pedals can rotate without colliding with any other part of the ABT.

In illustrative implementations, mechanical structure(s) prevent the two rear wheels from separating too far from each other. For instance, mechanical structure(s) may, for each rear wheel, limit the maximum number of degrees of a rotation of that rear wheel, which rotation: (a) is about an axis (e.g., a horizontal axis) external to that rear wheel; and (b) causes the two rear wheels to move farther apart from each other.

Figure 4B:
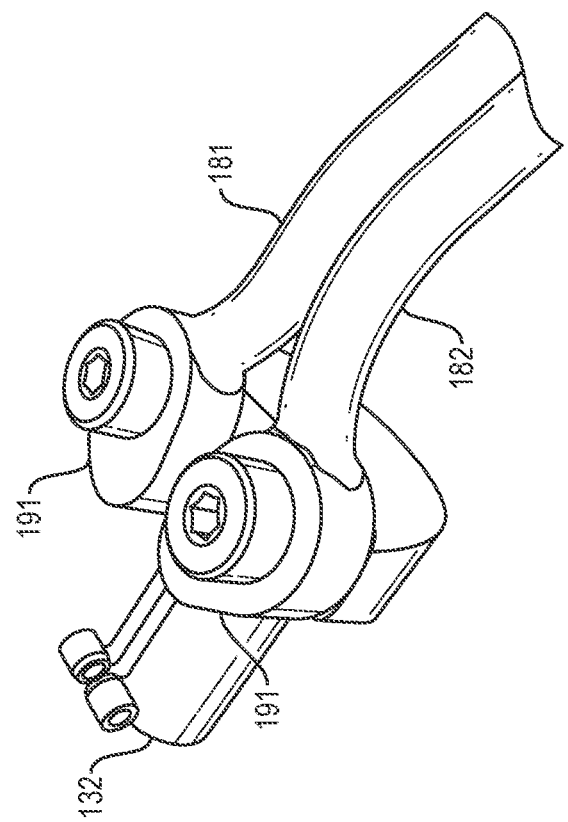
FIGS. 4A and 4B show oval cams that prevent the two rear wheels from spreading too far apart.
Figure 4A:
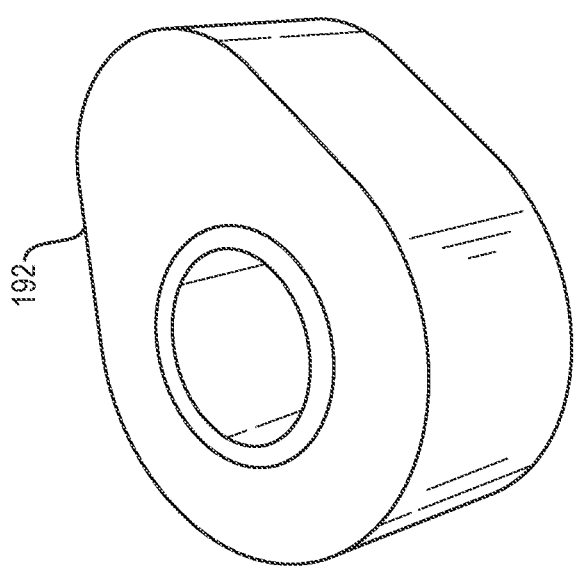

In some cases, oval cams prevent the two rear wheels from spreading too far apart. Examples of two such cams 191, 192 are shown in FIG. 4B. In FIGS. 1A, 1B, 3A, and 3B: (a) a right rear frame 181 is attached to (and its weight is supported by) right rear wheel 101; (b) a left rear frame 182 is attached to (and its weight is supported by-same here) left rear wheel 102; (c) oval cam 191 is attached to an upper end of right rear frame 181; (d) oval cam 192 is attached to an upper end of left rear frame 182; (e) when the ABT is in bicycle mode (as shown in FIGS. 1A, 2A, 3A) the two oval cams do not touch each other; and (f) when the ABT is in tricycle mode (as shown in FIGS. 1B, 2B, 3B), the two oval cams 191, 192 touch each other and prevent rear frames 181, 182 from rotating further, thereby preventing rear wheels 101 and 102 from spreading farther apart. Alternatively, the cams may be ellipsoidal or any other irregular shape.

In some use scenarios: (a) the weight of a rear frame is not supported by a rear wheel to which it is attached; and (b) the rear frame hangs from a hub attached to the seat tube of the ABT. For instance, this may occur when: (a) the ABT is tilted so that one of the rear wheels is not touching the ground; or (b) when one of the rear wheels is suspended over a hole in the ground.

Figure 5C:
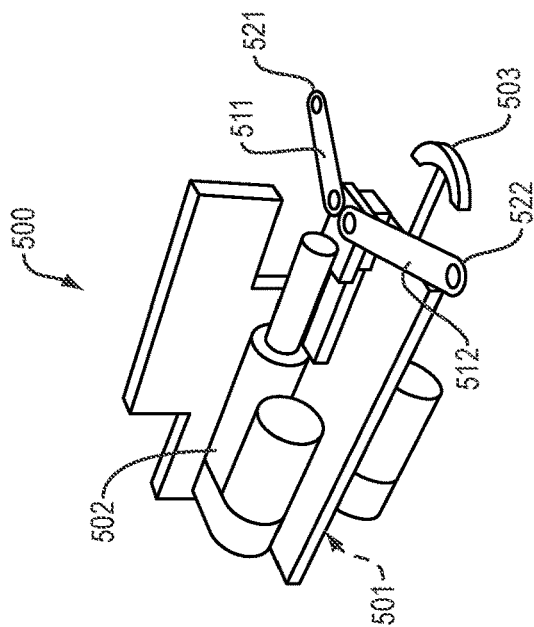
FIGS. 5A, 5B, and 5C show an actuated mechanism that spreads the two rear wheels apart or moves them closer together.
Figure 5B:
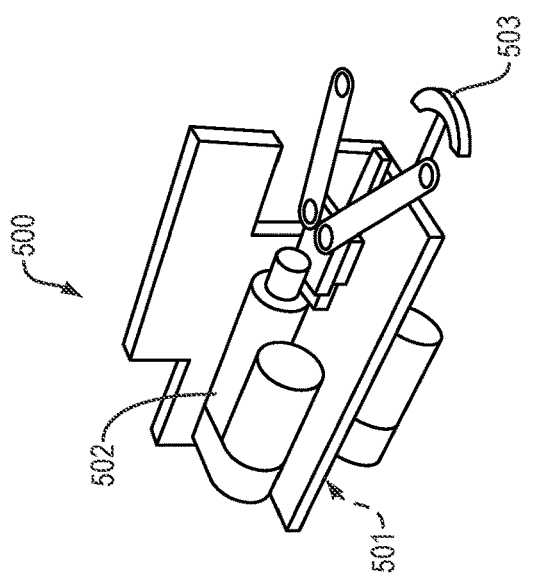
Figure 5A:
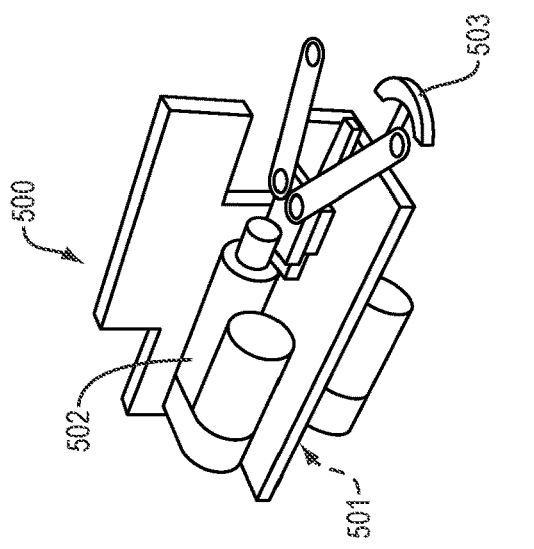

FIGS. 5A, 5B, and 5C show a mechanism 500 that spreads the two rear wheels apart and moves them closer together. Specifically, mechanism 500: (a) spreads the two rear wheels apart in order to change the ABT from bicycle mode to tricycle mode; and (b) moves the two rear wheels closer together in order to change the ABT from tricycle mode to bicycle mode. Mechanism 500 includes an upper linear actuator 502 and a lower linear actuator 501. Each of these two actuators 501, 502 is powered by an electric motor (e.g., a servomotor). Upper linear actuator 502 causes a metal bar to undergo linear motion which is translated, by one or more joints (e.g. spherical joints), into rotational motion of rear frames 181, 182 (and thus of rear wheels 101, 102). Lower linear actuator 501 helps lock the two rear frames into place when the ABT is in bicycle mode, thereby increasing structural rigidity when the ABT is in bicycle mode.

In FIG. 5A, the ABT is in bicycle mode, and lower linear actuator 501 is acting as a locking mechanism preventing the two rear wheels from separating. Specifically, lower linear actuator 501 controls the position of curved part 503. In FIG. 5A, lower linear actuator 501 has moved curved part 503 to a position in which curved part 503 constrains movement of the two rear frames 181, 182, preventing the rear frames from moving further apart from each other. For instance, when the ABT is in bicycle mode and curved part 503 is in the position shown in FIG. 5A, curved part 503: (a) may partially curve around tubes that are part of the two rear frames; and (b) may thereby constrain the two rear frames from moving farther apart from each other. This is helpful because, in bicycle mode, the two rear wheels might otherwise tend to move apart under the weight of a human rider of the ABT. Lower linear actuator 501 and curved part 503 may together lock (or help to lock) the two rear frames in position relative to each other, when the ABT is in bicycle mode. This may distribute forces that might otherwise be borne solely by the pinion joints which are attached to the rear frames.

In FIG. 5B, lower linear actuator 501 is unlocked, thereby freeing the two rear frames to move relative to each other. Unlocking lower linear actuator 501 causes bar 503 to extend outward (e.g., away from the seat tube). In FIG. 5B, upper linear actuator 502 is still in a bicycle mode position. In FIG. 5B, upper linear actuator 502 can actuate movement of the rear frames without that movement being constrained by curved part 503.

In FIG. 5C, lower linear actuator 501 is unlocked, and upper linear actuator 502 has moved to a tricycle mode position. Specifically, upper linear actuator 502 has caused a metal part to undergo linear motion, which in turn has caused joints 521, 522 to spread apart. Joints 521 and 522 are near ends of metal links 511 and 512, respectively. Joints 521 and 522 are attached to rear frames 181 and 182, respectively, which are in turn attached to rear wheels 101 and 102, respectively. Spreading joints 521, 522 apart causes rear wheels 101, 102 to undergo rotational motion that moves them further apart from each other. Links 511 and 512 may comprise metal rods, metal bars or metal threads. Joints 521, 522 may comprise spherical joints or ball joints.

In order to change the ABT from tricycle mode to bicycle mode, the process described in the preceding paragraph may be reversed. Upper linear actuator 502 may cause ends 521, 522 of links 511 and 512 to move back together, thereby causing rear wheels 101, 102 to move back together into bicycle mode position. Then lower linear actuator 501 may lock, thereby locking the position of the mechanism during bicycle mode.

In some implementations: (a) during bicycle mode, transportation of the ABT from a first location to a second location is powered by pedaling of a human rider; (b) during bicycle mode, the bicycle is steered by a human; (c) during tricycle mode, locomotion of the ABT is powered by an electric motor; (c) during tricycle mode, operation of the ABT (including steering, speed of motor, and braking) is autonomous and the ABT operates autonomously without a human rider. In some other implementations, during bicycle mode, locomotion of the ABT is at least partially driven by an electric motor that either assists or replaces pedaling by a human rider.

In some implementations, the seat tube of the ABT is telescopic. The height of the telescopic seat tube may be adjusted to prevent the seat of the ABT from colliding with mechanism 500.

In some cases, the drive motor for the ABT is: (a) a front hub motor, housed in or adjacent to a hub of the front wheel of the ABT; (b) a rear hub motor, housed in or adjacent to a hub of rear wheel of the ABT; or (c) a mid-drive motor, housed in the central frame of the ABT. In some cases, a front hub motor is desirable because it: (a) is easier to install than a mid-drive or rear hub motor; and (b) tends to help balance the distribution of weight of the ABT between the front and back of the ABT. In some cases, a mid-drive motor is desirable because it may use the ABT's transmission as the motor's gears, allowing the motor to run in an optimum RPM (revolutions per minute) range. This is turn may allow the mid-drive motor to be lighter and more efficient than a hub motor, such as when moving up a steep slope.

Figure 6:
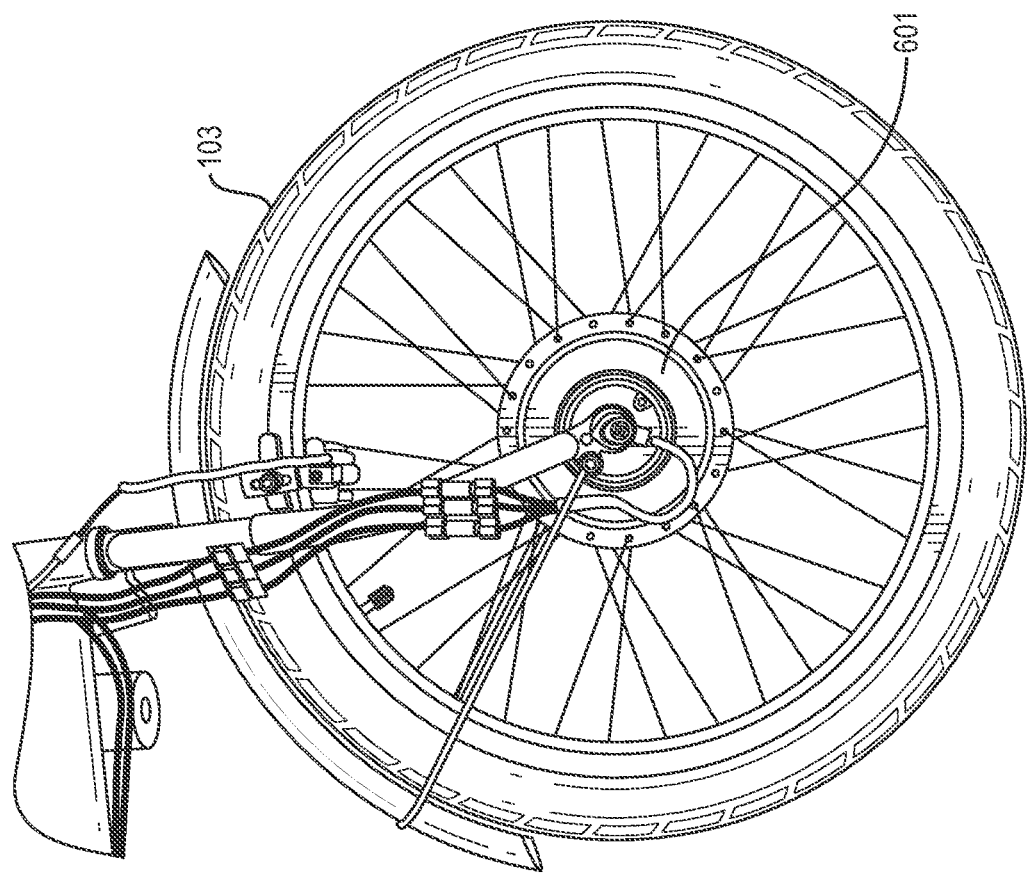
FIG. 6 shows a front hub motor.

FIG. 6 shows a front hub motor. In FIG. 6, front hub motor 601 drives rotation of front wheel 103 about its axle. This rotation powers locomotion of the ABT. For instance, the front hub motor may entirely drive locomotion of the ABT during tricycle mode or may entirely or partially drive locomotion of the ABT during bicycle mode.

In illustrative implementations, the ABT includes a steering system, including an electric motor and transmission. The steering system may control steering of the ABT when the ABT is in tricycle mode and is operating in autonomous mode. The motor employed for steering may be mounted near the front of the ABT. For instance, the steering motor may be mounted on the so-called top tube of the main frame of the ABT. In some cases, at least one of the following mechanisms is employed to transmit torque from the steering motor to the front wheel: (a) a timing belt; (b) steel cables; (c) a chain; or (d) a linkage, such as a four-bar linkage. The steering system may control steering by controlling orientation of the front wheel of the ABT relative to the rest of the ABT.

Figure 7:
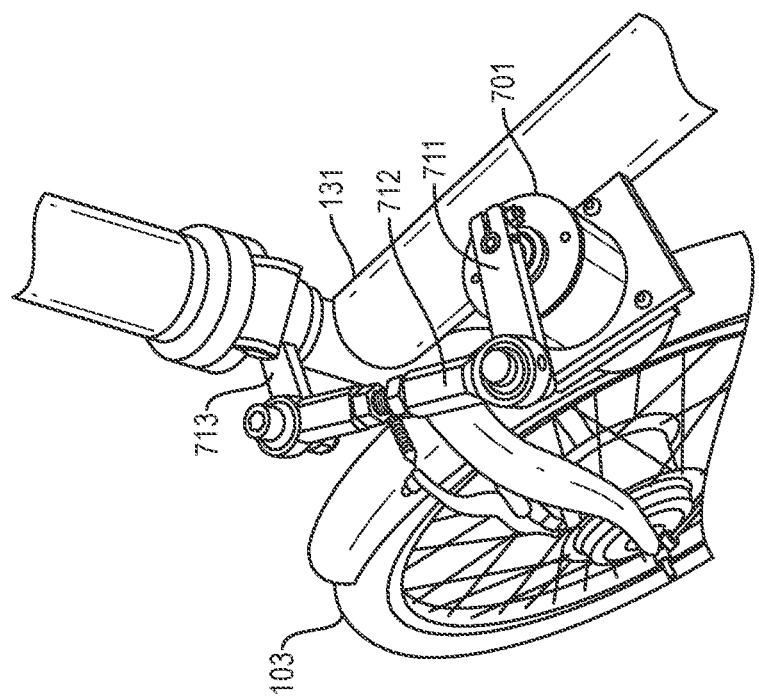
FIG. 7 shows an electric motor that controls steering of the front wheel.

FIG. 7 shows an electric motor 701 that powers steering of the front wheel of the ABT. Torque produced by motor 701 is transmitted to front wheel 103 via, among other things, a four-bar linkage. In FIG. 7, the mechanical linkage that transmits the steering torque includes four links, i.e., link 711, link 712, link 713 and a portion of top tube 131. In some cases, links 711, 712, 713 comprise metal rods or metal threads. In some cases, neighboring links in the linkage are joined to each other by spherical joints.

In some implementations, one or more electrical circuits onboard the ABT: (a) control the drive motor (e.g., front hub motor) and thus control speed of locomotion of the ABT; (b) control the steering motor, and thereby control steering of the ABT; and (c) control linear actuator(s), and thereby control whether the ABT is in bicycle mode or tricycle mode. For instance, these one or more electronic circuits may comprise drivers or ESC (electronic speed control) circuits, such as a VESC® circuit.

In some implementations, during autonomous mode, an additional servomotor may pull or push a brake cable of a brake of the ABT. For instance, an additional servomotor may pull a brake cable for the front wheel, to augment braking by a front hub motor.

Figure 8:
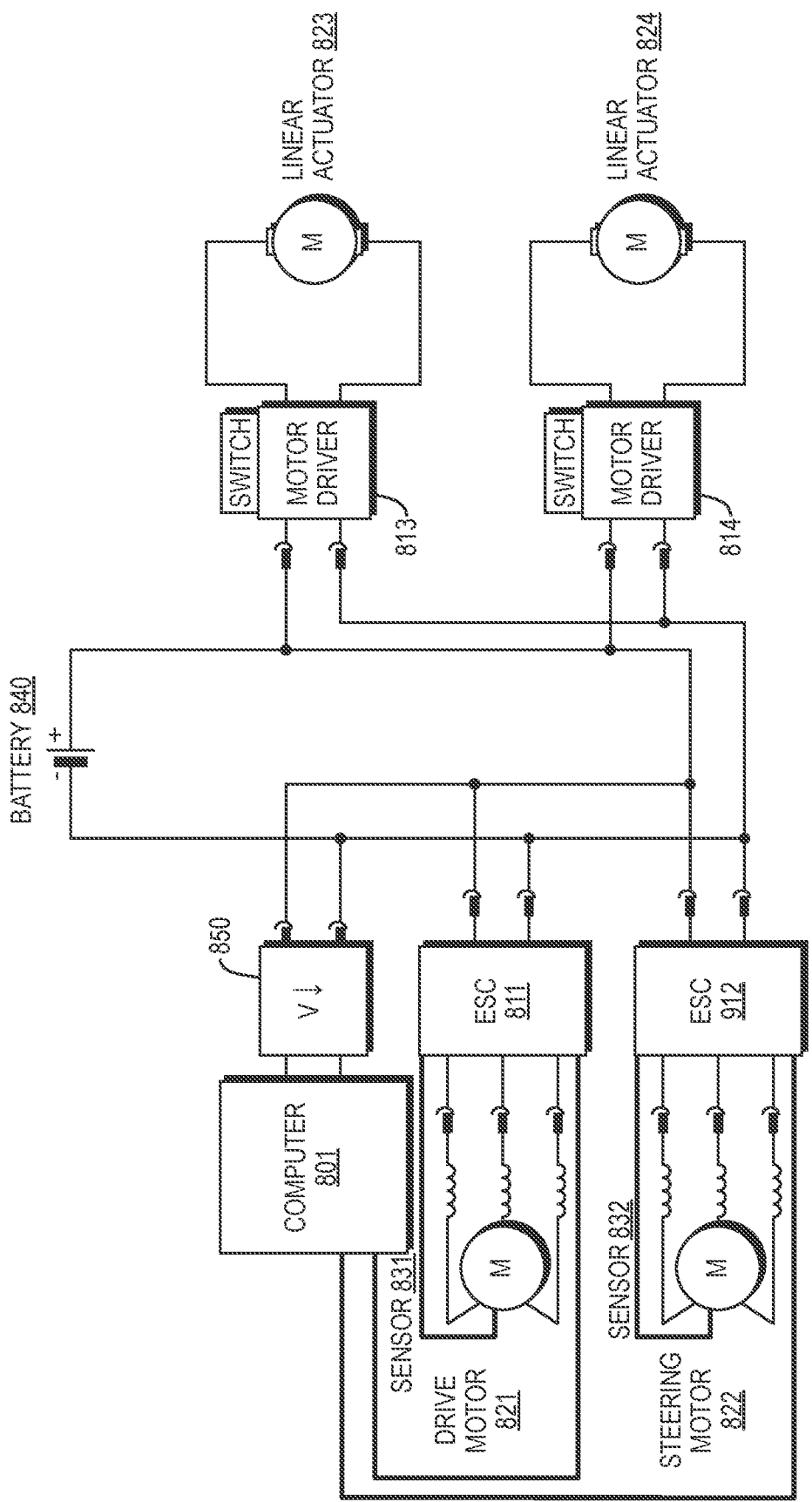
FIGS. 8 and 9 are each diagrams that illustrate hardware for power, steering and control.
Figure 9:
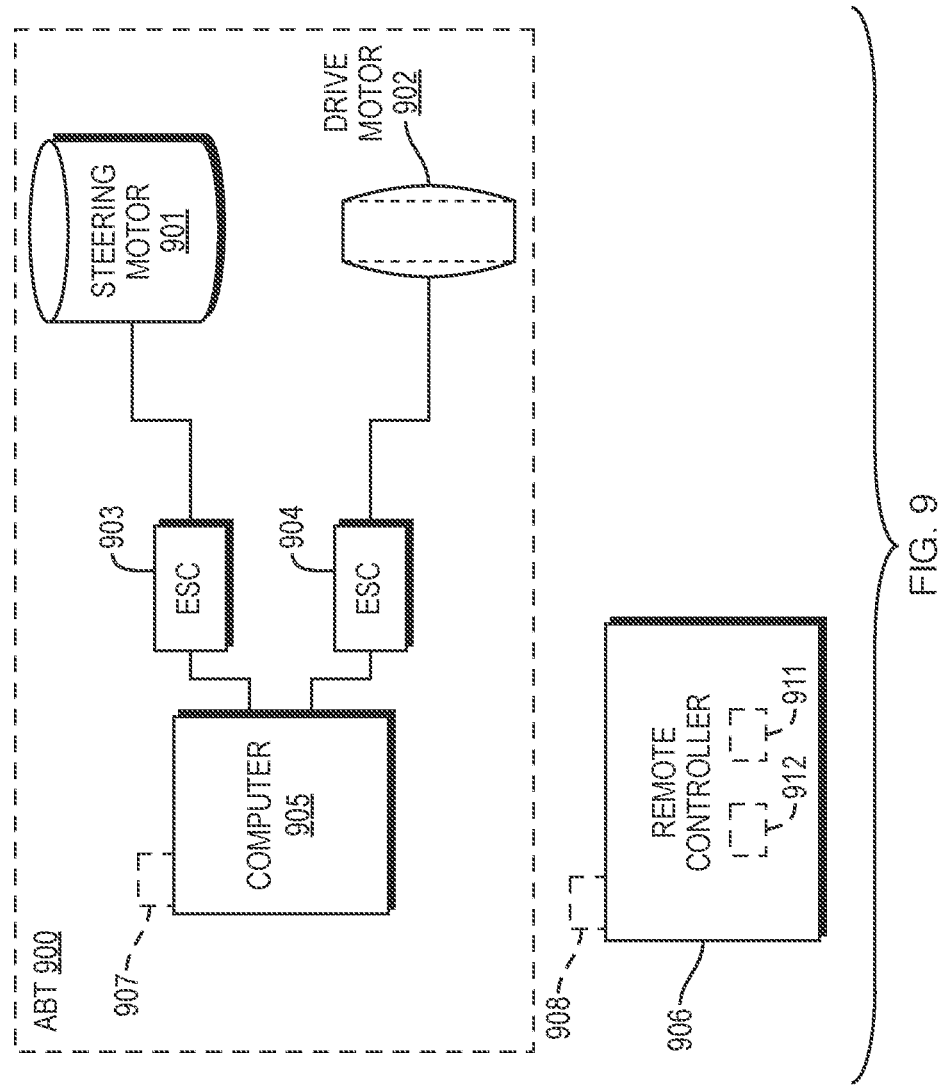

FIGS. 8 and 9 are each diagrams that illustrate hardware for power, steering and control of an ABT, in illustrative implementations of this invention.

In FIG. 8, a computer 801 controls motor drivers 813, 814 and ESC electronic circuits 811, 812. In turn: (a) ESC circuit 811 performs closed-loop control of a drive servomotor 821 which powers locomotion of the ABT; (b) ESC circuit 812 performs closed-loop control of a steering servomotor 822 which steers the ABT; (c) motor driver 813 controls linear actuator 823 which moves the rear wheels together (in order to be in bicycle mode) or apart (in order to be in tricycle mode); and (d) motor driver 814 controls linear actuator 824. Linear actuator 824 controls a mechanism that, when locked (e.g., in bicycle mode), tends to keep the two rear wheels together and that, when unlocked, allows the two rear wheels to separate from each other. In some cases, computer 801 comprises a NVIDIA® Jetson Nano™ computer which executes ROS (Robot Operating System) middleware software. In FIG. 8, sensors 831 and 832 provide feedback for the closed loop control of servomotors 821 and 822, respectively. For instance, sensors 831 and 832 may each comprise a Hall sensor. One or more batteries 840 may provide electrical power for the system. Optionally, a voltage reducer 850 may be employed (e.g., if computer 801 operates at a higher voltage than the rest of the system).

In FIG. 9, a remote controller 906 includes one or more computers 911 and one or more I/O (input/output devices) 912. For instance, I/O devices 912 may include one or more touch screens, joy sticks, mouses, keyboards, buttons, microphones, loudspeakers, LEDs (light-emitting diodes), light sources, and displays. In some cases, remote controller 906 is a handheld device and computer(s) 911 comprises one or more microprocessors or microcontrollers. In some alternative implementations: (a) remote controller 906 is not a handheld device; and (b) computer(s) 911 comprises one or more server computers.

In FIG. 9, remote controller 906 may, via wireless module 908, transmit wireless signals that control a computer 905 onboard an ABT 900. In some cases, onboard computer 905 comprises a NVIDIA® Jetson Nano™ computer which executes ROS (Robot Operating System) middleware. Onboard computer 905: (a) controls ESC circuit 903 which in turn controls a steering motor 901; and (b) controls ESC circuit 904 which in turn controls drive motor 902. In some cases, ESC circuits 903 and 904 each comprise a VESC® circuit.

Figure 10:
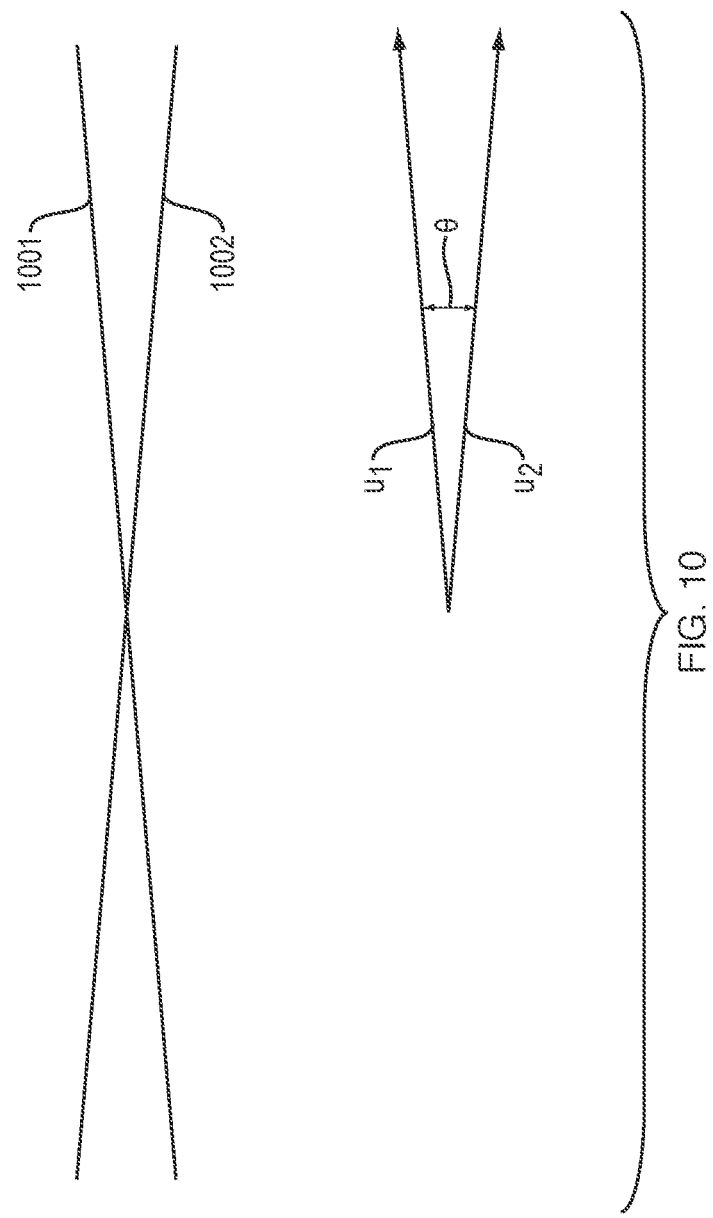
FIG. 10 shows an example of substantially parallel lines.

FIG. 10 shows an example of substantially parallel lines. In FIG. 10: (a) unit vectors $u_1$ and $u_2$ are parallel to straight lines 1001 and 1002, respectively; (b) unit vectors $u_1$ and $u_2$ form angle $\theta$; and (b) straight lines 1001 and 1002 are substantially parallel to each other if angle $\theta$ is (i) less than 20 degrees and greater than −20 degrees; or (ii) less than 200 degrees and greater than 160 degrees.

Bicycle to Tricycle Transformation

In some cases, the rear two wheels of the ABT act as a single wheel when the system is in closed position, which creates a user experience similar to riding a regular bicycle. When the user has arrived at his or her destination, the rear wheels may open up and the bicycle may become a tricycle that has sufficient stability to ride autonomously.

In some cases, each rear wheel is attached to an independent triangle formed by a seat tube, seat stay and chain tube. Each one of these triangles may be attached, via a pin joint, to a housing which is part of the main frame of the ABT. The pin joints may enable these triangles to rotate around the longitudinal direction of the ABT.

In some cases, an oval shaped cam is positioned at each of the pivot joints so that when the wheels are open the cams make contact and help prevent the rear wheels from separating more.

In some cases, two linear actuators generate movement to move the rear wheels closer together or farther apart: One linear actuator may act as a locking system serving as bracing for the structural rigidity of the system and keeping the wheels together in the closed position. The other linear actuator may transmit force through two connecting rods with spherical joints, in order to move the rear wheels apart from each other or to bring them back together.

For instance, to go from bicycle to tricycle mode: first, a lower linear actuator may expand releasing the locking system, then the triangles may be free to rotate and an upper linear actuator may expand and open the rear wheels. To go from tricycle to bicycle mode, the upper linear actuator may first retract to close the rear wheels, and then the lower linear actuator may retract causing the triangles and rear wheels to be locked next to each other during bicycle mode.

In bicycle mode, the two rear wheels may act as a single wheel when the system is closed. To achieve this, inner faces of the rear wheels: (a) may be flat; and (b) may be held from only one side. Coupling of the rear wheels may occur due to friction.

Autonomous Operation

When the ABT is operating autonomously (without a human rider), locomotion (e.g., forward movement) of the ABT may be powered by a first electric motor that drives the front wheel. Likewise, when the ABT is operating autonomously, steering may be powered a second electric motor that transmits torque to the handlebar by a four-bar linkage where the two ends of the coupler are ball joints. In some cases, both of these electric motors are brushless DC electric motors.

In some implementations, a group of autonomous ABTs function as a distributed robotic system or robotic swarm system. For instance, a fleet of autonomous ABTs may be distributed in the bicycle lanes of a city. Users may request the bicycles via a mobile app.

In some implementations of this invention, a fleet of autonomous ABTs may each receive, and make decisions based, on wireless radio signals that encode: (a) the state of street lights (e.g., stop, go, and caution corresponding to the conventional optical signals of green, red and yellow, respectively); (b) the location and state (e.g., occupied or available) of charging and maintenance points; (c) real-time traffic data, and (d) abnormal conditions on the road.

In some cases, when a user requests an ABT, one or more server computers which are remote from the ABTs select one or more candidate ABTs to go to the user, based on the positions of the ABTs and the user. The server may calculate a minimum-cost route that each of the candidate ABTs would take to travel to the user. The server may assign the trip to a selected ABT. Furthermore, the server may send data, via a wireless radio message to the selected ABT, that specifies a high-level route for the ABT to travel to reach the user. This route may specify lanes that the selected ABT should follow.

In some cases, the server may control, for each of the ABTs in the fleet, when the battery aboard that ABT is recharged. For instance, once that the battery of an ABT is below a certain level, a signal may be sent to the server periodically. The server may periodically estimate the ratio between the distance that the ABT would be able to travel with that level of battery and the distance to the closest charging point. When this ratio is close to being one—depending on the security margin that is desired—the server may send the ABT a command and route to go to a charging point.

Once a route is received by the ABT, one or more computers onboard the ABT may perform two different tasks: behavioral control and motion planning.

Behavioral Control: For each segment that the ABT will travel, the onboard computer(s) may calculate appropriate behavior based on limitations such as maximum speed, presence of crosswalks, or other signals received from the infrastructure. Furthermore, the ABT may react to real-world conditions such as traffic lights, pedestrians, bicycles, other autonomous vehicles, cars or unexpected objects in the surroundings. These conditions may be detected by one or more sensors that are onboard the ABT—such as lidar or video cameras—and processed by the onboard computers. The onboard computer(s) may calculate an action—such as avoid, slow down or stop—to be executed in response to a detected condition. This action would depend on the type of obstacle, size, distance to it, and speed and trajectory.

Motion Planning: Once the onboard computer(s) have determined an appropriate behavior (e.g., follow the lane, change the lane, turn left, cross crosswalk), the onboard computer(s) may translate the behavior into a dynamically possible trajectory that avoids the detected obstacles. To achieve this trajectory, the onboard computer(s) may send corresponding commands to motors onboard the ABT (e.g., the drive motor and steering motor and linear actuators). Odometers and/or other sensors onboard the ABT may provide feedback to a closed-loop control system onboard the ABT.

Mapping, Localization and Routing

In some implementations of this invention, the server and the onboard computers in ABTs may access and employ data from one or more high-definition (HD) maps. Each HD map may contain information about, among other things: (a) the location of lanes, (b) lane types, (c) boundaries; (d) directions; (e) curves; (f) street signs or other static signs; (g) usual road conditions; (h) speed limits; and (i) probabilities of dynamic properties (e.g., accidents, traffic, or speed) calculated based on prior data or real-time data sent from other autonomous vehicles. For instance, each HD map may include multiple layers, including at least: (a) a base map layer which comprises data about a basic road network; (b) a geometric map layer which comprises high-detail 3D information that is post-processed to produce derived map objects; (c) a semantic map layer which contains information regarding lane boundaries, intersections, crosswalks, traffic signs, street lights, or other static signs or other physical objects related to traffic; (d) a map priors layer which comprises information about dynamic elements that may be geometric or semantic and may indicate possible events; and (e) a real-time knowledge layer which is a read-write layer comprising data about traffic conditions such as congestion, speeds, and construction zones. Data in the real-time knowledge layer may be updated with information sent from one or more external sources (e.g., from other autonomous vehicles, from a server controlled by a local government, or from a server controlled by the operator of the ABT fleet).

In some implementations of this invention, an HD map may be employed for both localization (e.g., determining where an ABT or user is within the map) and routing (e.g., determining the most efficient route between two points).

For routing, accuracy in the order of meters may be sufficient.

For localization and navigation, centimeter-level accuracy may be desirable. In some cases, this centimeter-level accuracy is achieved with a differential augmented GNSS (global navigation satellite system) method, such as Real Time Kinematics (RTK), Satellite Based Augmentation System (SBAS) or Precise Point Positioning (PPP). Alternatively, in some cases, the centimeter-level accuracy is achieved by constellations of high-precision radio frequency sensors that: (a) provide precise localization where GNSS is not available or is not sufficiently accurate; and (b) measure the time-of-flight of coded ultra-wideband radiofrequency pulses. In some cases, a computer: (a) estimates position of the ABT by monitoring the ABT's movement with odometry and an inertial measurement unit; and (b) employs these estimates to validate and serve as a backup for localization data.

In some use scenarios, a computer: (a) has access to an HD map and to data that specifies the current position of an ABT; and (b) calculates a route that is the most efficient way to get from the current position to a target destination. To calculate the route, the computer may solve a conventional shortest path algorithm. For instance, the computer may perform Dijkstra's algorithm, by representing the network of lanes as a directed graph where the weights correspond to the 'cost' of going through each section.

Perception

In some implementations, each ABT may detect its surroundings by employing different sensors.

In some cases, each ABT performs the following five perception tasks:

(1) Image-Based Object Detection: A computer onboard the ABT may identify the proximity and size of both static and dynamic objects in the ABT's surroundings. For instance, a computer may employ a deep convolutional neural network for image-based object detection. In some cases, a single-stage detection framework is employed. In other cases, a region proposal detection network is employed.

(2) Semantic Segmentation: A computer onboard the ABT may perform image segmentation (e.g., labeling pixels based on classes) and/or instance segmentation (e.g., differentiating objects of the same class depending on their trajectories and behaviors).

(3) 3D Object Detection: A computer onboard the ABT may perform depth estimation, in order to represent sensor data in a three-dimensional space. For instance, the sensor data may comprise images captured by a single camera, by stereo cameras or by one or more multi-view cameras. Or, for instance, the sensor data may comprise data regarding lidar, radar and/or ultrasound measurements.

(4) Object Tracking: A computer onboard the ABT may estimate direction and speed of dynamic (moving) objects, in order to predict their trajectories and avoid collisions. In some cases, to estimate direction and speed of moving objects, a computer may employ: (a) a sensor-fusion strategy; and/or (b) a physical model of the tracked objects. In some cases, real-time object tracking is achieved with a monocular camera and deep learning.

(5) Lane detection: A computer onboard the ABT may perform lane detection. In some cases, a lane is a continuous surface, and thus lane detection may differ from the detection of other objects.

Onboard Sensors

In some implementations of this invention, sensors are mounted on an ABT. These sensors may take measurements that provide information about the ABT's surroundings. When the ABT is operating in autonomous mode, these measurements may be processed, in order to enable the ABT to respond appropriately to its surroundings. For instance, in FIG. 3G, one or more cameras 312, one or more lidar sensors 313, one or more radar devices 314, and one or more ultrasonic sensors 315: (a) are mounted on a vertical tube 311 that supports the handlebar of the ABT; and (b) take measurements of the ABT's surroundings. The sensor measurements may provide feedback to the autonomous control of the ABT. Alternatively, the types and number of sensors onboard the ABT may be different than as shown in FIG. 3G, and the sensors may be mounted in any position or positions onboard the ABT. For instance, one or more odometers may be employed to measure revolutions of the front wheel (or a rear wheel) about its axle. Likewise, for each servomotor (e.g., front hub servomotor) in the ABT, one or more sensors (e.g., Hall sensors) may be employed to measure movement (e.g., revolutions) of that servomotor. Likewise, one or more angle sensors may be employed to measure the steering angle of the front wheel. Any type of angle sensor(s) may be employed for this purpose, including touchless, non-contacting with shaft, hollow-shaft, multi-turn and open angle sensors Motion Planning and Path Tracking In some implementations of this invention, a computer (e.g., onboard the ABT) performs motion planning. The motion planning may include processing the perceived information to find a path, selecting the safest maneuver, and determining the most feasible trajectory.

In some cases, a computer performs a motion planning algorithm that operates sequentially, separating different functionalities that relate to each other with well-defined interfaces. Detected objects of interest may be represented in a scene description and commands may be computed afterward. For example, the decision-making and planning method may be based on sequential planning. The sequential planning may include: (a) input space discretization with collision checking; (b) randomized planning; and/or (c) constrained optimization and receding-horizon control. Alternatively, at least some perception tasks may be implemented with at least some planning tasks. Alternatively, a computer may perform end-to-end learning, in which a neural network is trained to send commands to motors, based on sensor data. Alternatively, a computer may perform behavior-aware motion planning. This behavior-aware motion planning may be based on interactive and cooperative decision making instead of taking rule-based decisions.

In some implementations of this invention, a computer (e.g., onboard the ABT) performs path tracking. The path tracking may include calculating appropriate movements that enable an ABT to follow a path. For instance, the path tracking algorithm may involve geometric path tracking, based on a geometric relationship between a geometry and the path.

Prototype

The following 13 paragraphs describe a prototype of this invention.

In this prototype, motors in the linear actuators are controlled by PWM DC motor controllers with a DPDT switch and a potentiometer as speed regulator. The linear actuators move the rear wheels apart for tricycle mode and move the rear wheels close together for bicycle mode.

In this prototype, to accommodate two wheels in the rear, the chain-line is wider than in a regular bicycle. To have the crankset and cassette aligned, the bottom bracket is wider.

In this prototype, the two rear wheels act like a single wheel when the ABT is in bicycle mode. To achieve this, the inner faces of the rear wheels are flat and each rear wheel is held from only one side (e.g., is attached on only one side to an external triangular structure which connects the wheel to the main frame of the ABT).

In this prototype, coupling of the rear wheels during bicycle mode happens by the friction of the tires. When a rider is about to start to pedal with the right foot, the rider may lean the ABT to the left. In this situation, the wheel in contact with the pavement is the left rear wheel but the force from the pedals is being transmitted to the right rear wheel. If a corrective step were not taken, this might cause the two rear wheels to slide relative to each other, which in turn might cause power to not be transmitted from the right wheel to the left wheel. To solve this problem, in this prototype, small rubber stickers are attached to the inner rim of one of the rear wheels.

In this prototype, motors enable locomotion (also known as propulsion) and steering when the ABT is operating in autonomous mode.

In this prototype, the front hub motor (which may propel or help to propel the ABT) is a Nidec GAMS 55R motor, which has an output power of 148 watts and works with 24 volt. The motor is laced to the rim, with a single cross.

In this prototype, the steering motor is a Nidec GAMS 48R motor with a gearbox which has a power of 64 watts and a rated torque of 0.2 Newton\m with a gear-ratio of 1:144.

In this prototype, a four-bar linkage transmits torque from the steering motor to the handlebar.

In this prototype, the drive motor and steering motor are controlled using VESC hardware and software. Together, the VESC hardware and software function as a customizable electronic speed controller. Each VESC controller is connected on one side to the battery and on the other side to a motor through three phases (u, v, w). Each VESC controller enables up to 50 A with peaks of 240 A, a voltage of 8-60 V, and also enables reverse current that may be used for regenerative braking or for charging the battery by pedaling.

In this prototype, each VESC controller is configured for field-oriented control (FOC) of the drive and steering motors, with feedback from Hall sensors.

In this prototype, a Jetson Nano™ computer controls the VESC circuits, and is housed in a front box of the ABT. The Jetson Nano™ computer is an embedded system-on-module (SoM) that runs on Ubuntu® software, with quad-core ARM Cortex-A57, 128-core NVIDIA® Maxwell GPU (1.43 GHz) and memory 4 GB 64-bit LPDDR4|25.6 GB/s. A positive polarity power jack for 5V, 4 A, provides power to the Jetson Nano™ computer. Launch commands are included in the rc.local file of the Jetson Nano™ computer. Thus, whenever the battery is powered, the Jetson Nano™ computer turns on and the control program runs automatically, working as a "plug-and-play" device.

In this prototype, ROS (robot operating system) software is employed to send commands to the VESC circuits for the drive and steering motors. A remote controller sends the commands to the ABT via Bluetooth® wireless transmissions. The ROS software employed in the prototype includes, among other things: (a) catkin, which is the ROS build system; (b) roslaunch, which is used to launch multiple ROS nodes either locally or remotely; and (c) the ROS joy package.

In this prototype, a 24 volt battery provides electric power to the drive motor, steering motor, and linear actuators. This 24 volt battery has: (a) a capacity of 10 ampere\hour; (b) Lithium-ion batteries in 7-S, 5-P configuration; (c) PCB board protection for overcharge, over-discharge, overload, and short circuit; and (d) a battery management system (BMS) which supervises the battery's voltage, temperature, current, and state of charge. In the event of a problem with the battery, the BMS may either give an alarm or cut off the power, depending on the severity of the problem. The BMS also regulates the energy among batteries to balance the consumption and expand the discharge cycle.

The prototype described in the preceding 13 paragraphs is a non-limiting example of this invention. This invention may be implemented in many different ways.

Software

In the Computer Program Listing above, six computer program files are listed. These six computer program files comprise software employed in a prototype of this invention.

In order to submit these six programs to the U.S. Patent and Trademark Office, the six program files were converted to ASCII .txt format. In each of these six programs, these changes may be reversed, so that the six programs may be run. Specifically, these changes may be reversed by: (a) changing the file extension for devices.txt from ".txt" to ".rules"; (b) changing the file extension for joy.txt from ".txt" to ".launch"; (c) changing the file extension for joysticicktest.txt from ".txt" to ".cpp"; (d) changing the file extension for joysticktest.txt from ".txt" to ".launch"; (e) changing the file extension for setRule.txt from ".txt" to ".sh"; and (f) changing the file extension for vesc.txt from ".txt" to ".launch".

This invention is not limited to the software set forth in these six computer program files. Other software may be employed. Depending on the particular implementation, the software used in this invention may vary.

More Details

When a vehicle is traveling forward along a route, a front wheel of the vehicle may pass a given point on the route before a rear wheel of the vehicle does. For instance, in FIGS. 1A-3B, when the ABT is traveling forward along a route, front wheel 103 may pass a point on the route before rear wheels 101 and 102 do. In FIGS. 1A-3B, the front wheel 103, right rear wheel 101 and left rear wheel 103 may each support weight of the ABT while these wheels touch and roll over a surface that is underneath the vehicle. For instance, when the ABT is traveling from one location to another, wheels 101, 102, 103 may each touch and roll over a paved surface (e.g., of a road, sidewalk, driveway, parking lot or bridge) or an unpaved surface (e.g., dirt or grass).

Computers

In illustrative implementations of this invention, one or more computers (e.g., servers, network hosts, client computers, integrated circuits, microcontrollers, controllers, microprocessors, processors, field-programmable-gate arrays, personal computers, digital computers, driver circuits, or analog computers) are programmed or specially adapted to perform one or more of the following tasks: (1) to control the operation of, or interface with, hardware components of an electric-powered vehicle, including any motors, linear actuators, or sensors; (2) to cause actuators to move rear wheels together and spread them apart; (3) to control a motor that propels the vehicle; (4) to control a motor that steers the vehicle; (5) to control braking, e.g., by a hub motor or by a motor that pulls a brake cable; (6) to access a map and other data regarding the vehicle's surroundings; (7) to calculate a route; (8) to select which vehicle to send to pick up a user at a particular location; (9) to process sensor measurements to detect in real-time conditions or events in the vehicle's surroundings; (10) to cause the vehicle to react to detected conditions or events, such as by altering speed or direction or selecting a different route; (11) to cause an electrically-powered vehicle to operate, at some times, in a manner that is at least partially autonomous without a human rider; (12) to perform centralized, high-level control of a fleet of electric-powered vehicles that each operate autonomously in some local aspects; (13) to receive data from, control, or interface with one or more sensors; (14) to perform any other calculation, computation, program, algorithm, or computer function described or implied herein; (15) to receive signals indicative of human input; (16) to output signals for controlling transducers for outputting information in human perceivable format; (17) to process data, to perform computations, and to execute any algorithm or software; and (18) to control the read or write of data to and from memory devices (tasks 1-18 of this sentence being referred to herein as the "Computer Tasks"). The one or more computers (e.g., 801, 905, 911) may each comprise: (a) a central processing unit, (b) an ALU (arithmetic logic unit), (c) a memory unit, and (d) a control unit that controls actions of other components of the computer in such a way that encoded steps of a program are executed in a sequence. In some cases, the one or more computers communicate with each other or with other devices: (a) wirelessly; (b) by wired connection, such as an electrical wire, an electrical cable or a fiber-optic link; or (c) by a combination of wireless and wired links.

In exemplary implementations, one or more computers are programmed to perform any and all calculations, computations, programs, algorithms, computer functions and computer tasks described or implied herein. For example, in some cases: (a) a machine-accessible medium has instructions encoded thereon that specify steps in a software program; and (b) the computer accesses the instructions encoded on the machine-accessible medium, in order to determine steps to execute in the program. In exemplary implementations, the machine-accessible medium may comprise a tangible non-transitory medium. In some cases, the machine-accessible medium comprises (a) a memory unit or (b) an auxiliary memory storage device. For example, in some cases, a control unit in a computer fetches the instructions from memory.

In illustrative implementations, one or more computers execute programs according to instructions encoded in one or more tangible, non-transitory computer-readable media. For example, in some cases, these instructions comprise instructions for a computer to perform any calculation, computation, program, algorithm, or computer function described or implied herein. For instance, in some cases, instructions encoded in a tangible, non-transitory, computer-accessible medium comprise instructions for a computer to perform the Computer Tasks.

Computer Readable Media

In some implementations, this invention comprises one or more computers that are programmed to perform one or more of the Computer Tasks.

In some implementations, this invention comprises one or more tangible, machine readable media, with instructions encoded thereon for one or more computers to perform one or more of the Computer Tasks. In some implementations, these one or more media are not transitory waves and are not transitory signals.

In some implementations, this invention comprises participating in a download of software, where the software comprises instructions for one or more computers to perform one or more of the Computer Tasks. For instance, the participating may comprise (a) a computer providing the software during the download, or (b) a computer receiving the software during the download.

Network Communication

In illustrative implementations of this invention, one or more devices (e.g., 312, 313, 314, 315, 801, 905, 911) are configured for wireless or wired communication with other devices in a network.

For example, in some cases, one or more of these devices include a wireless module for wireless communication with other devices in a network. Each wireless module (e.g., 907, 908) may include (a) one or more antennas, (b) one or more wireless transceivers, transmitters or receivers, and (c) signal processing circuitry. Each wireless module may receive and transmit data in accordance with one or more wireless standards.

In some cases, one or more of the following hardware components are used for network communication: a computer bus, a computer port, network connection, network interface device, host adapter, wireless module, wireless card, signal processor, modem, router, cables and wiring.

In some cases, one or more computers (e.g., 801, 905, 911) are configured for wireless or wired communication with other devices in a network. For example, in some cases, one or more computers are programmed for network communication: (a) in accordance with the Internet Protocol Suite, or (b) in accordance with any other industry standard for communication, including any USB standard, ethernet standard (e.g., IEEE 802.3), token ring standard (e.g., IEEE 802.5), or wireless communication standard, including IEEE 802.11 (Wi-Fi®), IEEE 802.15 (Bluetooth®/Zigbee®), IEEE 802.16, IEEE 802.20, GSM (global system for mobile communications), UMTS (universal mobile telecommunication system), CDMA (code division multiple access, including IS-95, IS-2000, and WCDMA), LTE (long term evolution), or 5G (e.g., ITU IMT-2020).

Definitions

The terms "a" and "an", when modifying a noun, do not imply that only one of the noun exists. For example, a statement that "an apple is hanging from a branch": (i) does not imply that only one apple is hanging from the branch; (ii) is true if one apple is hanging from the branch; and (iii) is true if multiple apples are hanging from the branch.

To compute "based on" specified data means to perform a computation that takes the specified data as an input.

Non-limiting examples of a "camera" include: (a) a digital camera; (b) a digital grayscale camera; (c) a digital color camera; (d) a video camera; (e) a light sensor, imaging sensor, or photodetector; (f) a set or array of light sensors, imaging sensors or photodetectors; (h) a light field camera or plenoptic camera; (i) a time-of-flight camera; and (j) a depth camera.

The term "comprise" (and grammatical variations thereof) shall be construed as if followed by "without limitation". If A comprises B, then A includes B and may include other things.

The term "computer" means a computational device that is configured to perform logical and arithmetic operations. Each of the following is a non-limiting example of a "computer", as that term is used herein: (a) digital computer; (b) analog computer; (c) computer that performs both analog and digital computations; (d) microcontroller; (e) controller; (f) microprocessor; (g) processor; (h) field-programmable gate array; (i) tablet computer; (j) notebook computer; (k) laptop computer, (l) personal computer; (m) mainframe computer; (n) integrated circuit; (o) server computer; (p)

client computer; and (q) quantum computer. However, a human is not a "computer", as that term is used herein.

"Computer Tasks" is defined above.

The term "convex hull" is used herein in its geometric sense. For instance, the "convex hull" of a 3D object is the smallest convex bounding volume for the 3D object.

"DC" means direct current.

"Defined Term" means a term or phrase that is set forth in quotation marks in this Definitions section.

"DPDT" means double pole double throw.

For an event to occur "during" a time period, it is not necessary that the event occur throughout the entire time period. For example, an event that occurs during only a portion of a given time period occurs "during" the given time period.

The term "e.g." means for example.

The fact that an "example" or multiple examples of something are given does not imply that they are the only instances of that thing. An example (or a group of examples) is merely a non-exhaustive and non-limiting illustration.

Unless the context clearly indicates otherwise: (1) a phrase that includes "a first" thing and "a second" thing does not imply an order of the two things (or that there are only two of the things); and (2) such a phrase is simply a way of identifying the two things, so that they each may be referred to later with specificity (e.g., by referring to "the first" thing and "the second" thing later). For example, if a device has a first socket and a second socket, then, unless the context clearly indicates otherwise, the device may have two or more sockets, and the first socket may occur in any spatial order relative to the second socket. A phrase that includes a "third" thing, a "fourth" thing and so on shall be construed in like manner.

"For instance" means for example.

To say a "given" X is simply a way of identifying the X, such that the X may be referred to later with specificity. To say a "given" X does not create any implication regarding X. For example, to say a "given" X does not create any implication that X is a gift, assumption, or known fact.

"Herein" means in this document, including text, specification, claims, abstract, and drawings.

As used herein: (1) "implementation" means an implementation of this invention; (2) "embodiment" means an embodiment of this invention; (3) "case" means an implementation of this invention; and (4) "use scenario" means a use scenario of this invention.

The term "include" (and grammatical variations thereof) shall be construed as if followed by "without limitation".

"I/O device" means an input/output device. Non-limiting examples of an I/O device include a touch screen, other electronic display screen, keyboard, mouse, microphone, handheld electronic game controller, digital stylus, display screen, speaker, or projector for projecting a visual display.

Unless the context clearly indicates otherwise, "or" means and/or. For example, A or B is true if A is true, or B is true, or both A and B are true. Also, for example, a calculation of A or B means a calculation of A, or a calculation of B, or a calculation of A and B.

"PWM" means pulse-width modulation.

As used herein, the term "set" does not include a group with no elements.

Unless the context clearly indicates otherwise, "some" means one or more.

As used herein, a "subset" of a set consists of less than all of the elements of the set.

As used herein, a "substantial distance" between two wheels means a distance that is greater than or equal to one tenth of a reference diameter and less than or equal to two reference diameters. For purposes of the preceding sentence, a reference diameter is: (a) if the two wheels are of equal diameter, the diameter of one of the wheels; and (b) if one of the wheels has a larger diameter than the other wheel, the larger diameter.

As used herein, to say that two angular speeds are "substantially equal" means that the two angular speeds: (a) differ from each other by less than 10%; or (b) are equal.

As used herein, to say that a line is "substantially horizontal" means that the line: (a) diverges from horizontal by less than 20 degrees; or (b) is horizontal.

As used herein, to say that a first straight line and a second straight line are "substantially parallel" means that the magnitude of the dot product of two unit vectors $u_1$ and $u_2$ is greater than the cosine of 20 degrees, where $u_1$ and $u_2$ are parallel to the first and second straight lines, respectively. In the preceding sentence, the magnitude of the dot product is greater than the cosine of 20 degrees when: (a) $u_1$ and $u_2$ are parallel to the first and second straight lines, respectively; and (b) the angle between $u_1$ and $u_2$ is either: (i) less than 20 degrees and greater than −20 degrees; or (ii) less than 200 degrees and greater than 160 degrees.

A non-limiting example of a first wheel and a second wheel "touching" each other, as that term is used herein, occurs when a thin layer attached to the first wheel touches the second wheel or touches a thin layer attached to the second wheel. For purposes of the preceding sentence, a layer attached to a wheel is "thin" if the thickness of the layer is less than 10% of the thickness of the wheel, with thickness of the layer and thickness of the wheel each being measured in a dimension that is parallel to the centerline of the axle of the wheel.

The term "such as" means for example.

"3D" means three dimensional.

To say that a machine-readable medium is "transitory" means that the medium is a transitory signal, such as an electromagnetic wave.

"2D" means two dimensional.

As used herein, to say that a vehicle is "upright" means that: (a) at least a front wheel and a back wheel of the vehicle are above and touching a flat, horizontal physical surface that is underneath the vehicle; and (b) at least part of the weight of each of these wheels is resting on the horizontal physical surface.

Except to the extent that the context clearly requires otherwise, if steps in a method are described herein, then the method includes variations in which: (1) steps in the method occur in any order or sequence, including any order or sequence different than that described herein; (2) any step or steps in the method occur more than once; (3) any two steps occur the same number of times or a different number of times during the method; (4) one or more steps in the method are done in parallel or serially; (5) any step in the method is performed iteratively; (6) a given step in the method is applied to the same thing each time that the given step occurs or is applied to a different thing each time that the given step occurs; (7) one or more steps occur simultaneously; or (8) the method includes other steps, in addition to the steps described herein.

Headings are included herein merely to facilitate a reader's navigation of this document. A heading for a section does not affect the meaning or scope of that section.

This Definitions section shall, in all cases, control over and override any other definition of the Defined Terms. The Applicant or Applicants are acting as his, her, its or their own lexicographer with respect to the Defined Terms. For example, the definitions of Defined Terms set forth in this Definitions section override common usage and any external dictionary. If a given term is explicitly or implicitly defined in this document, then that definition shall be controlling, and shall override any definition of the given term arising from any source (e.g., a dictionary or common usage) that is external to this document. If this document provides clarification regarding the meaning of a particular term, then that clarification shall override any definition of the given term arising from any source (e.g., a dictionary or common usage) that is external to this document. Unless the context clearly indicates otherwise, any definition or clarification herein of a term or phrase applies to any grammatical variation of the term or phrase, taking into account the difference in grammatical form. For example, the grammatical variations include noun, verb, participle, adjective, and possessive forms, and different declensions, and different tenses.

Variations

This invention may be implemented in many different ways. Here are some non-limiting examples:

In some implementations, this invention is vehicle which includes: (a) three wheels that are configured to support weight of the vehicle while touching and rolling over a surface that is underneath the vehicle during the rolling, which three wheels consist of a first rear wheel, a second rear wheel and a front wheel; and (b) a first motor and a second motor; wherein (i) the vehicle is configured to operate at some times in a tricycle mode, in such a way that (A) the first and second rear wheels are located at a substantial distance from each other and are tilted relative to each other, (B) the first motor provides propulsion for the vehicle, and (C) the second motor steers the vehicle, (ii) the vehicle is configured to operate at other times in a bicycle mode, in such a way that (A) the first and second rear wheels are touching each other, (B) the vehicle is steered by a human rider, and (C) the vehicle is propelled, at least in part, by pedaling by the human rider, and (iii) the vehicle is configured to transition from bicycle mode to tricycle mode, or from tricycle mode to bicycle mode, by rotating the first rear wheel and second rear wheel about respective axes of rotation, which axes of rotation are substantially horizontal when the ABT is upright. In some cases, the respective axes of rotations are substantially parallel to a longitudinal axis of the vehicle. In some cases: (a) the vehicle also includes a seat and a frame, which frame includes a head tube and a seat tube; and (b) the respective axes of rotations are substantially parallel to a longitudinal axis of the vehicle, which longitudinal axis lies entirely in a vertical plane that intersects the head tube and the seat tube. In some cases: (a) the vehicle also includes a pedal mechanism and a chain; and (b) the vehicle is configured in such a way that, during at least certain times in bicycle mode (i) the pedal mechanism drives motion of the chain which in turn drives rotation of the first rear wheel about a first axle, and (ii) friction between the first and second rear wheels tends to cause rotation of the second rear wheel about a second axle. In some cases: (a) the vehicle further includes a set of one or more polymer layers, each respective polymer layer in the set being attached to the first rear wheel or to the second rear wheel; (b) the vehicle is configured in such a way that, in bicycle mode, the set of polymer layers (i) is located between and is touching the first and second rear wheels, and (ii) tends to increase friction between the first and second rear wheels and thereby tends to prevent the first and second rear wheels from slipping relative to each other. In some cases, the vehicle is configured in such a way that, when the vehicle is in tricycle mode and the first and second rear wheels are rolling over the surface: (a) the first rear wheel rotates about a first axis; (b) the second rear wheel rotates about a second axis; and (c) the first and second axes form an obtuse angle that is greater than 140 degrees less than 175 degrees. In some cases: (a) the vehicle further includes a first linear actuator and a second linear actuator; (b) the first linear actuator is configured to cause the first and second rear wheels to undergo the rotating during the transition from bicycle mode to tricycle mode or from tricycle mode to bicycle mode; and (c) the second linear actuator is configured to lock and to unlock the rotating that occurs or would otherwise occur during the transition. In some cases: (a) the vehicle further includes one or more computers and one or more sensors; (b) the sensors are configured to take measurements of surroundings of the vehicle; (c) the one or more computers are programmed (i) to detect, based on the measurements, one or more conditions or events in the surroundings of the vehicle, and (ii) to output instructions to cause the vehicle to respond to at least some of the one or more conditions or events that are detected. In some cases, the vehicle further includes one or more computers that are programmed to control propulsion and steering of the vehicle during tricycle mode without real-time input from a human. In some cases: (a) the vehicle also includes one or more wireless transceivers that are configured to receive wireless radio signals from sources that are external to the vehicle, which wireless radio signals encode at least a route for the vehicle to take; and (b) the vehicle further includes one or more computers that are programmed to control propulsion and steering of the vehicle during tricycle mode without real-time input from a human, in such a way as to cause the vehicle to travel in the route. Each of the cases described above in this paragraph is an example of the vehicle described in the first sentence of this paragraph, and is also an example of an embodiment of this invention that may be combined with other embodiments of this invention.

In some implementations, this invention is a method comprising: (a) operating a vehicle at some times in a tricycle mode, in such a way that (i) a first rear wheel of the vehicle and a second rear wheel of the vehicle are located at a substantial distance from each other and are tilted relative to each other, (ii) a first motor onboard the vehicle provides propulsion for the vehicle, and (iii) a second motor onboard the vehicle steers the vehicle; (b) operating the vehicle at other times in a bicycle mode, in such a way that the first and second rear wheels are touching each other; and (c) transitioning the vehicle from bicycle mode to tricycle mode, or from tricycle mode to bicycle mode, by rotating the first rear wheel and second rear wheel about respective axes of rotation, which axes of rotation are substantially horizontal when the ABT is upright; wherein (i) the vehicle also includes a front wheel, and (ii) the front wheel, first rear wheel, and second rear wheel are each configured to support weight of the vehicle and to touch and roll over a surface that is underneath the vehicle. In some cases, during at least some times during bicycle mode, the vehicle is steered by a human rider and is propelled at least in part by the human rider. In some cases, the respective axes of rotations are substantially parallel to a longitudinal axis of the vehicle. In some cases: (a) the vehicle also includes a seat and a frame, which frame includes a head tube and a seat tube; and (b) the respective axes of rotations are substantially parallel to a longitudinal axis of the vehicle, which longitudinal axis lies entirely in a vertical plane that intersects the head tube and the seat tube. In some cases, the method further comprises, during at least some times when the vehicle is in bicycle mode: (a) driving, with a pedal mechanism, motion of a chain and thereby driving rotation of the first rear wheel about a first axle, and (b) rotating the second rear wheel about a second axle, due to friction between the first and second rear wheels. In some cases, the method further comprises positioning one or more polymer layers between the first and second rear wheels during bicycle mode, in such a way as to increase friction between the first and second rear wheels. In some cases, the method further comprises: (a) causing, with a first linear actuator, the rotating of the first and second rear wheels during the transition from bicycle mode to tricycle mode or from tricycle mode to bicycle mode; and (b) mechanically locking and unlocking, with a second linear actuator, the rotating that occurs or would otherwise occur during the transition. In some cases, the method further comprises: (a) taking, with one or more sensors onboard the vehicle, measurements of surroundings of the vehicle; (b) detecting, based on the measurements, one or more conditions or events in the surroundings of the vehicle; and (c) outputting instructions to cause the vehicle to respond to at least some of the one or more conditions or events that are detected. In some cases, the method further comprises controlling, with one or more computers that are onboard the vehicle, propulsion and steering of the vehicle during tricycle mode without real-time input from a human. In some cases, the method further comprises: (a) receiving wireless radio signals from sources that are external to the vehicle, which wireless radio signals encode at least a route for the vehicle to take; and (b) controlling, with one or more computers that are onboard the vehicle, propulsion and steering of the vehicle during tricycle mode without real-time input from a human, in such a way as to cause the vehicle to travel in the route. Each of the cases described above in this paragraph is an example of the method described in the first sentence of this paragraph, and is also an example of an embodiment of this invention that may be combined with other embodiments of this invention.

Each description herein (or in the Provisional) of any method, apparatus or system of this invention describes a non-limiting example of this invention. This invention is not limited to those examples, and may be implemented in other ways.

Each description herein (or in the Provisional) of any prototype of this invention describes a non-limiting example of this invention. This invention is not limited to those examples, and may be implemented in other ways.

Each description herein (or in the Provisional) of any implementation, embodiment or case of this invention (or any use scenario for this invention) describes a non-limiting example of this invention. This invention is not limited to those examples, and may be implemented in other ways.

Each Figure, diagram, schematic or drawing herein (or in the Provisional) that illustrates any feature of this invention shows a non-limiting example of this invention. This invention is not limited to those examples, and may be implemented in other ways.

The above description (including without limitation any attached drawings and figures) describes illustrative implementations of the invention. However, the invention may be implemented in other ways. The methods and apparatus which are described herein are merely illustrative applications of the principles of the invention. Other arrangements, methods, modifications, and substitutions by one of ordinary skill in the art are also within the scope of the present invention. Numerous modifications may be made by those skilled in the art without departing from the scope of the invention. Also, this invention includes without limitation each combination and permutation of one or more of the items (including any hardware, hardware components, methods, processes, steps, software, algorithms, features, and technology) that are described herein.

What is claimed:

1. A vehicle which includes:
   (a) three wheels that are configured to support weight of the vehicle while touching and rolling over a surface that is underneath the vehicle during the rolling, which three wheels consist of a first rear wheel, a second rear wheel and a front wheel;
   (b) a first motor and a second motor, wherein
      (i) the vehicle is configured to operate at some times in a tricycle mode, in such a way that (A) the first and second rear wheels are located at a substantial distance from each other and are tilted relative to each other, (B) the first motor provides propulsion for the vehicle, and (C) the second motor steers the vehicle;
      (ii) the vehicle is configured to operate at other times in a bicycle mode, in such a way that (A) the first and second rear wheels are touching each other, (B) the vehicle is steered by a human rider, (C) the vehicle is propelled, at least in part, by pedaling by the human rider, and (D) the first and second rear wheels rotate together as a single unit about a same axis of rotation; and
      (iii) the vehicle is configured to transition from bicycle mode to tricycle mode, or from tricycle mode to bicycle mode, by rotating the first rear wheel and second rear wheel about respective axes of rotation, which axes of rotation are substantially horizontal when the ABT is upright;
   (c) one or more patches of polymer material, each respective one of the one or more patches of polymer material being attached to one of:
      (i) a rim of the first rear wheel; or
      (ii) a rim of the second rear wheel; or
      (iii) to both a rim of the first rear wheel and a rim of the second rear wheel;
   (d) the vehicle is configured in such a way that, in bicycle mode, at least one of the one or more patches of polymer material:
      (i) is located between and is touching the rim of the first rear wheel and the rim of the second rear wheel, and
      (ii) tends to increase friction between the rim of the first rear wheel and the rim of the second rear wheel and thereby tends to prevent the rim of the first rear wheel and the rim of the second rear wheel from slipping relative to each other.

2. The vehicle of claim 1, wherein the respective axes of rotations are substantially parallel to a longitudinal axis of the vehicle.

3. The vehicle of claim 1, wherein:
   (a) the vehicle also includes a seat and a frame, which frame includes a head tube and a seat tube; and
   (b) the respective axes of rotations are substantially parallel to a longitudinal axis of the vehicle, which longitudinal axis lies entirely in a vertical plane that intersects the head tube and the seat tube.

4. The vehicle of claim 1, wherein:
   (a) the vehicle also includes a pedal mechanism and a chain; and
   (b) the vehicle is configured in such a way that, during at least certain times in bicycle mode
      (i) the pedal mechanism drives motion of the chain which in turn drives rotation of the first rear wheel about a first axle, and (ii) friction between the first and second rear wheels tends to cause rotation of the second rear wheel about a second axle.

5. The vehicle of claim 1, wherein the vehicle is configured in such a way that, when the vehicle is in tricycle mode and the first and second rear wheels are rolling over the surface: (a) the first rear wheel rotates about a first axis; (b) the second rear wheel rotates about a second axis; and (c) the first and second axes form an obtuse angle that is greater than 140 degrees less than 175 degrees.

6. The vehicle of claim 1, wherein:
(a) the vehicle further includes a first linear actuator and a second linear actuator;
(b) the first linear actuator is configured to cause the first and second rear wheels to undergo the rotating during the transition from bicycle mode to tricycle mode or from tricycle mode to bicycle mode; and
(c) the second linear actuator is configured to lock and to unlock the rotating that occurs or would otherwise occur during the transition.

7. The vehicle of claim 1, wherein:
(a) the vehicle further includes one or more computers and one or more sensors;
(b) the sensors are configured to take measurements of surroundings of the vehicle;
(c) the one or more computers are programmed
(i) to detect, based on the measurements, one or more conditions or events in the surroundings of the vehicle, and
(i) to output instructions to cause the vehicle to respond to at least some of the one or more conditions or events that are detected.

8. The vehicle of claim 1, wherein the vehicle further includes one or more computers that are programmed to control propulsion and steering of the vehicle during tricycle mode without real-time input from a human.

9. The vehicle of claim 1, wherein:
(a) the vehicle also includes one or more wireless transceivers that are configured to receive wireless radio signals from sources that are external to the vehicle, which wireless radio signals encode at least a route for the vehicle to take; and
(b) the vehicle further includes one or more computers that are programmed to control propulsion and steering of the vehicle during tricycle mode without real-time input from a human, in such a way as to cause the vehicle to travel in the route.

10. A method comprising:
(a) operating a vehicle at some times in a tricycle mode, in such a way that (i) a first rear wheel of the vehicle and a second rear wheel of the vehicle are located at a substantial distance from each other and are tilted relative to each other, (ii) a first motor onboard the vehicle provides propulsion for the vehicle, and (iii) a second motor onboard the vehicle steers the vehicle;
(b) operating the vehicle at other times in a bicycle mode, in such a way that the first and second rear wheels are touching each other and rotate together as a single unit about a same axis of rotation;
(c) transitioning the vehicle from bicycle mode to tricycle mode, or from tricycle mode to bicycle mode, by rotating the first rear wheel and second rear wheel about respective axes of rotation, which axes of rotation are substantially horizontal when the ABT is upright wherein (i) the vehicle also includes a front wheel, and
(ii) the front wheel, first rear wheel, and second rear wheel are each configured to support weight of the vehicle and to touch and roll over a surface that is underneath the vehicle; and
(d) positioning one or more patches of polymer material between the rim of the first rear wheel and the rim of the second rear wheel during bicycle mode, in such a way as to increase friction between the rim of the first rear wheel and the rim of the second rear wheel.

11. The method of claim 10, wherein, during at least some times during bicycle mode, the vehicle is steered by a human rider and is propelled at least in part by the human rider.

12. The method of claim 10, wherein the respective axes of rotations are substantially parallel to a longitudinal axis of the vehicle.

13. The method of claim 10, wherein:
(a) the vehicle also includes a seat and a frame, which frame includes a head tube and a seat tube; and
(b) the respective axes of rotations are substantially parallel to a longitudinal axis of the vehicle, which longitudinal axis lies entirely in a vertical plane that intersects the head tube and the seat tube.

14. The method of claim 10, wherein the method further comprises, during at least some times when the vehicle is in bicycle mode:
(a) driving, with a pedal mechanism, motion of a chain and thereby driving rotation of the first rear wheel about a first axle, and
(b) rotating the second rear wheel about a second axle, due to friction between the first and second rear wheels.

15. The method of claim 10, wherein the method further comprises:
(a) causing, with a first linear actuator, the rotating of the first and second rear wheels during the transition from bicycle mode to tricycle mode or from tricycle mode to bicycle mode; and
(b) mechanically locking and unlocking, with a second linear actuator, the rotating that occurs or would otherwise occur during the transition.

16. The method of claim 10, wherein the method further comprises:
(a) taking, with one or more sensors onboard the vehicle, measurements of surroundings of the vehicle;
(b) detecting, based on the measurements, one or more conditions or events in the surroundings of the vehicle; and
(c) outputting instructions to cause the vehicle to respond to at least some of the one or more conditions or events that are detected.

17. The method of claim 10, wherein the method further comprises controlling, with one or more computers that are onboard the vehicle, propulsion and steering of the vehicle during tricycle mode without real-time input from a human.

18. The method of claim 10, wherein the method further comprises:
(a) receiving wireless radio signals from sources that are external to the vehicle, which wireless radio signals encode at least a route for the vehicle to take; and
(b) controlling, with one or more computers that are onboard the vehicle, propulsion and steering of the vehicle during tricycle mode without real-time input from a human, in such a way as to cause the vehicle to travel in the route.

\* \* \* \* \*